(12) United States Patent
Zhou et al.

(10) Patent No.: US 12,512,164 B2
(45) Date of Patent: Dec. 30, 2025

(54) MEMORY SYSTEM AND OPERATION METHOD THEREOF, AND READABLE STORAGE MEDIUM

(71) Applicant: YANGTZE MEMORY TECHNOLOGIES CO., LTD., Wuhan (CN)

(72) Inventors: Teng Zhou, Wuhan (CN); Qian Sun, Wuhan (CN); Xiaodong Xu, Wuhan (CN); Wen Luo, Wuhan (CN); Yuzhe Chi, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 197 days.

(21) Appl. No.: 18/527,984

(22) Filed: Dec. 4, 2023

(65) Prior Publication Data

US 2025/0014653 A1  Jan. 9, 2025

(30) Foreign Application Priority Data

Jul. 7, 2023 (CN) .......................... 202310837674.6

(51) Int. Cl.
*G11C 7/00* (2006.01)
*G11C 16/08* (2006.01)
*G11C 16/26* (2006.01)
*G11C 29/42* (2006.01)

(52) U.S. Cl.
CPC .............. *G11C 16/26* (2013.01); *G11C 16/08* (2013.01); *G11C 29/42* (2013.01)

(58) Field of Classification Search
CPC ....... G11C 7/1051; G11C 7/22; G11C 7/1072; G11C 7/1006; G11C 7/1066
USPC ...................................... 365/189.15
See application file for complete search history.

(56) References Cited

U.S. PATENT DOCUMENTS

2016/0247576 A1* 8/2016 Park .................... G11C 11/5642
2016/0357472 A1* 12/2016 Choi ................... G06F 11/0754

* cited by examiner

*Primary Examiner* — Son T Dinh
(74) *Attorney, Agent, or Firm* — Conley Rose, P.C.

(57) ABSTRACT

A memory system, an operation method thereof and a readable storage medium are provided according to examples of this disclosure. The memory system including: a memory device including a plurality of memory blocks, each of which including a plurality of word lines and a plurality of memory cells coupled to the plurality of word lines; a memory controller coupled to the memory device and configured to: acquire a read retry voltage with both a first-type read retry table and a second-type read retry table; control the memory device to perform a read retry operation with the read retry voltage.

20 Claims, 16 Drawing Sheets

FIG. 8

| READ RETRY OPTION | Rd1 LP | | Rd2 MP | | Rd3 UP | | Rd4 MP | | Rd5 LP | | Rd6 MP | | Rd7 UP | | OPTION |
|---|---|---|---|---|---|---|---|---|---|---|---|---|---|---|---|
| | OFFSET VOLTAGE | OFFSET POSITION | OFFSET VOLTAGE | OFFSET POSITION | OFFSET VOLTAGE | OFFSET POSITION | OFFSET VOLTAGE | OFFSET POSITION | OFFSET VOLTAGE | OFFSET POSITION | OFFSET VOLTAGE | OFFSET POSITION | OFFSET VOLTAGE | OFFSET POSITION | |
| WORDLINE | a1 | b1 | c1 | d1 | e1 | f1 | g1 | h1 | i1 | j1 | k1 | l1 | m1 | n1 | RR-1 |
| | a2 | b2 | c2 | d2 | e2 | f2 | g2 | h2 | i2 | j2 | k2 | l2 | m2 | n2 | RR-2 |
| | a3 | b3 | c3 | d3 | e3 | f3 | g3 | h3 | i3 | j3 | k3 | l3 | m3 | n3 | RR-3 |
| | a4 | b4 | c4 | d4 | e4 | f4 | g4 | h4 | i4 | j4 | k4 | l4 | m4 | n4 | RR-4 |
| | a5 | b5 | c5 | d5 | e5 | f5 | g5 | h5 | i5 | j5 | k5 | l5 | m5 | n5 | RR-5 |
| | a6 | b6 | c6 | d6 | e6 | f6 | g6 | h6 | i6 | j6 | k6 | l6 | m6 | n6 | RR-6 |
| | a7 | b7 | c7 | d7 | e7 | f7 | g7 | h7 | i7 | j7 | k7 | l7 | m7 | n7 | RR-7 |
| | a8 | b8 | c8 | d8 | e8 | f8 | g8 | h8 | i8 | j8 | k8 | l8 | m8 | n8 | RR-8 |
| | a9 | b9 | c9 | d9 | e9 | f9 | g9 | h9 | i9 | j9 | k9 | l9 | m9 | n9 | RR-9 |
| | a10 | b10 | c10 | d10 | e10 | f10 | g10 | h10 | i10 | j10 | k10 | l10 | m10 | n10 | RR-10 |
| | a11 | b11 | c11 | d11 | e11 | f11 | g11 | h11 | i11 | j11 | k11 | l11 | m11 | n11 | RR-11 |
| | a12 | b12 | c12 | d12 | e12 | f12 | g12 | h12 | i12 | j12 | k12 | l12 | m12 | n12 | RR-12 |
| | a13 | b13 | c13 | d13 | e13 | f13 | g13 | h13 | i13 | j13 | k13 | l13 | m13 | n13 | RR-13 |
| | a14 | b14 | c14 | d14 | e14 | f14 | g14 | h14 | i14 | j14 | k14 | l14 | m14 | n14 | RR-14 |
| | a15 | b15 | c15 | d15 | e15 | f15 | g15 | h15 | i15 | j15 | k15 | l15 | m15 | n15 | RR-15 |
| | a16 | b16 | c16 | d16 | e16 | f16 | g16 | h16 | i16 | j16 | k16 | l16 | m16 | n16 | RR-16 |
| | a17 | b17 | c17 | d17 | e17 | f17 | g17 | h17 | i17 | j17 | k17 | l17 | m17 | n17 | RR-17 |
| | a18 | b18 | c18 | d18 | e18 | f18 | g18 | h18 | i18 | j18 | k18 | l18 | m18 | n18 | RR-18 |
| | a19 | b19 | c19 | d19 | e19 | f19 | g19 | h19 | i19 | j19 | k19 | l19 | m19 | n19 | RR-19 |
| | a20 | b20 | c20 | d20 | e20 | f20 | g20 | h20 | i20 | j20 | k20 | l20 | m20 | n20 | RR-20 |
| | a21 | b21 | c21 | d21 | e21 | f21 | g21 | h21 | i21 | j21 | k21 | l21 | m21 | n21 | RR-21 |
| | a22 | b22 | c22 | d22 | e22 | f22 | g22 | h22 | i22 | j22 | k22 | l22 | m22 | n22 | RR-22 |
| | a23 | b23 | c23 | d23 | e23 | f23 | g23 | h23 | i23 | j23 | k23 | l23 | m23 | n23 | RR-23 |
| | a24 | b24 | c24 | d24 | e24 | f24 | g24 | h24 | i24 | j24 | k24 | l24 | m24 | n24 | RR-24 |
| | a25 | b25 | c25 | d25 | e25 | f25 | g25 | h25 | i25 | j25 | k25 | l25 | m25 | n25 | RR-25 |
| | a26 | b26 | c26 | d26 | e26 | f26 | g26 | h26 | i26 | j26 | k26 | l26 | m26 | n26 | RR-26 |
| | a27 | b27 | c27 | d27 | e27 | f27 | g27 | h27 | i27 | j27 | k27 | l27 | m27 | n27 | RR-27 |
| | a28 | b28 | c28 | d28 | e28 | f28 | g28 | h28 | i28 | j28 | k28 | l28 | m28 | n28 | RR-28 |
| | a29 | b29 | c29 | d29 | e29 | f29 | g29 | h29 | i29 | j29 | k29 | l29 | m29 | n29 | RR-29 |
| | a30 | b30 | c30 | d30 | e30 | f30 | g30 | h30 | i30 | j30 | k30 | l30 | m30 | n30 | RR-30 |
| | a31 | b31 | c31 | d31 | e31 | f31 | g31 | h31 | i31 | j31 | k31 | l31 | m31 | n31 | RR-31 |
| | a32 | b32 | c32 | d32 | e32 | f32 | g32 | h32 | i32 | j32 | k32 | l32 | m32 | n32 | RR-32 |
| | a33 | b33 | c33 | d33 | e33 | f33 | g33 | h33 | i33 | j33 | k33 | l33 | m33 | n33 | RR-33 |
| | ... | ... | ... | ... | ... | ... | ... | ... | ... | ... | ... | ... | ... | ... | |
| | a189 | b189 | c189 | d189 | e189 | f189 | g189 | h189 | i189 | j189 | k189 | l189 | m189 | n189 | RR-189 |

| READ RETRY OPTION | Rd1 LP | | Rd2 MP | | Rd3 UP | | Rd4 MP | | Rd5 LP | | Rd6 MP | | Rd7 UP | | OPTION |
|---|---|---|---|---|---|---|---|---|---|---|---|---|---|---|---|
| | OFFSET VOLTAGE | OFFSET POSITION | OFFSET VOLTAGE | OFFSET POSITION | OFFSET VOLTAGE | OFFSET POSITION | OFFSET VOLTAGE | OFFSET POSITION | OFFSET VOLTAGE | OFFSET POSITION | OFFSET VOLTAGE | OFFSET POSITION | OFFSET VOLTAGE | OFFSET POSITION | |
| WORDLINE | a1 | b1 | c1 | d1 | e1 | f1 | g1 | h1 | i1 | j1 | k1 | l1 | m1 | n1 | RR-1 |
| | a9 | b9 | c9 | d9 | e9 | f9 | g9 | h9 | i9 | j9 | k9 | l9 | m9 | n9 | RR-9 |
| | a10 | b10 | c10 | d10 | e10 | f10 | g10 | h10 | i10 | j10 | k10 | l10 | m10 | n10 | RR-10 |
| | a11 | b11 | c11 | d11 | e11 | f11 | g11 | h11 | i11 | j11 | k11 | l11 | m11 | n11 | RR-11 |
| | a12 | b12 | c12 | d12 | e12 | f12 | g12 | h12 | i12 | j12 | k12 | l12 | m12 | n12 | RR-12 |
| | a13 | b13 | c13 | d13 | e13 | f13 | g13 | h13 | i13 | j13 | k13 | l13 | m13 | n13 | RR-13 |
| | a14 | b14 | c14 | d14 | e14 | f14 | g14 | h14 | i14 | j14 | k14 | l14 | m14 | n14 | RR-14 |
| | a15 | b15 | c15 | d15 | e15 | f15 | g15 | h15 | i15 | j15 | k15 | l15 | m15 | n15 | RR-15 |
| | a16 | b16 | c16 | d16 | e16 | f16 | g16 | h16 | i16 | j16 | k16 | l16 | m16 | n16 | RR-16 |
| | a17 | b17 | c17 | d17 | e17 | f17 | g17 | h17 | i17 | j17 | k17 | l17 | m17 | n17 | RR-17 |
| | a18 | b18 | c18 | d18 | e18 | f18 | g18 | h18 | i18 | j18 | k18 | l18 | m18 | n18 | RR-18 |
| | a19 | b19 | c19 | d19 | e19 | f19 | g19 | h19 | i19 | j19 | k19 | l19 | m19 | n19 | RR-19 |
| | a20 | b20 | c20 | d20 | e20 | f20 | g20 | h20 | i20 | j20 | k20 | l20 | m20 | n20 | RR-20 |
| | a21 | b21 | c21 | d21 | e21 | f21 | g21 | h21 | i21 | j21 | k21 | l21 | m21 | n21 | RR-21 |
| | a22 | b22 | c22 | d22 | e22 | f22 | g22 | h22 | i22 | j22 | k22 | l22 | m22 | n22 | RR-22 |
| | a23 | b23 | c23 | d23 | e23 | f23 | g23 | h23 | i23 | j23 | k23 | l23 | m23 | n23 | RR-23 |
| | a24 | b24 | c24 | d24 | e24 | f24 | g24 | h24 | i24 | j24 | k24 | l24 | m24 | n24 | RR-24 |
| | a25 | b25 | c25 | d25 | e25 | f25 | g25 | h25 | i25 | j25 | k25 | l25 | m25 | n25 | RR-25 |
| | a26 | b26 | c26 | d26 | e26 | f26 | g26 | h26 | i26 | j26 | k26 | l26 | m26 | n26 | RR-26 |
| | a27 | b27 | c27 | d27 | e27 | f27 | g27 | h27 | i27 | j27 | k27 | l27 | m27 | n27 | RR-27 |
| | a28 | b28 | c28 | d28 | e28 | f28 | g28 | h28 | i28 | j28 | k28 | l28 | m28 | n28 | RR-28 |
| | a29 | b29 | c29 | d29 | e29 | f29 | g29 | h29 | i29 | j29 | k29 | l29 | m29 | n29 | RR-29 |
| | a30 | b30 | c30 | d30 | e30 | f30 | g30 | h30 | i30 | j30 | k30 | l30 | m30 | n30 | RR-30 |
| | a31 | b31 | c31 | d31 | e31 | f31 | g31 | h31 | i31 | j31 | k31 | l31 | m31 | n31 | RR-31 |
| | a32 | b32 | c32 | d32 | e32 | f32 | g32 | h32 | i32 | j32 | k32 | l32 | m32 | n32 | RR-32 |
| | a33 | b33 | c33 | d33 | e33 | f33 | g33 | h33 | i33 | j33 | k33 | l33 | m33 | n33 | RR-33 |

FIG. 10

| THE SECOND VOLTAGE OFFSET VALUE | -90 | | -190 | | -60 | | -160 | | -30 | | -120 | | 0 | | -90 | | 0 |
|---|---|---|---|---|---|---|---|---|---|---|---|---|---|---|---|---|---|
| WRITTEN WORD LINE POSITION | OPEN WL0-56 | | | | OPEN WL57-116 | | | | OPEN WL117-172 | | | | OPEN WL173-230 | | | CLOSE BLK |
| WL INDEX | INNER WL | EDGE WL | INNER WL | EDGE WL | INNER WL | EDGE WL | INNER WL | EDGE WL | INNER WL | EDGE WL | INNER WL | EDGE WL | INNER WL | EDGE WL | INNER WL | EDGE WL | ANY WL |
| 0 | | | | | | | | | | | | | | | | | |
| ...... | | | | | | | | | | | | | | | | | |
| 56 | | | | | | | | | | | | | | | | | |
| 57 | | | | | | | | | | | | | | | | | |
| ...... | | | | | | | | | | | | | | | | | |
| 116 | | | | | | | | | | | | | | | | | |
| 117 | | | | | | | | | | | | | | | | | |
| ...... | | | | | | | | | | | | | | | | | |
| 172 | | | | | | | | | | | | | | | | | |
| ...... | | | | | | | | | | | | | | | | | |
| 230 | | | | | | | | | | | | | | | | | |
| 231 | | | | | | | | | | | | | | | | | |

FIG. 12A

| SETTING | NUMBER OF RR | RR | COMMENT | RELATIVE TO RR-1&9-33 CLOSE BLK |
|---|---|---|---|---|
| 1 | 26 | RR-1&9~33 | (CLOSE BLK)/(OPEN WL173-230 INNER WL) | REFERENCE CASE, ALL LEVEL -0 MV |
| 2 | 26 | RR-34~59 | (OPEN WL0-56 INNER WL)/ (OPEN WL173-230 EDGE WL) | VRD1~7 ALL LEVEL -90MV |
| 3 | 26 | RR-60~85 | OPEN WL57-116 INNER WL | VRD1~7 ALL LEVEL -60MV |
| 4 | 26 | RR-86~111 | OPEN WL117-172 INNER WL | VRD1~7 ALL LEVEL -30MV |
| 5 | 26 | RR-112~137 | OPEN WL0-56 EDGE WL | VRD1~7 ALL LEVEL -190MV |
| 6 | 26 | RR-138~163 | OPEN WL57-116 EDGE WL | VRD1~7 ALL LEVEL -160MV |
| 7 | 26 | RR-164~189 | OPEN WL117-172 EDGE WL | VRD1~7 ALL LEVEL -120MV |
| 8 | 1 | RR-2 | CLOSE BLK IVS | ADDITIONAL SCENARIOS |
| 9 | 5 | RR-3~7 | OPEN BLK INNER WL IVS | |
| 10 | 1 | RR-8 | OPEN BLK EDGE WL IVS | |

FIG. 12B

| THE SECOND VOLTAGE OFFSET VALUE | -100 | -90 | -80 | -200 | -190 | -180 | -70 | -60 | -50 | -170 | -160 | -150 | | | |
|---|---|---|---|---|---|---|---|---|---|---|---|---|---|---|---|
| MEMORY STATE | P1 | P2-P6 | P7 | P1 | P2-P6 | P7 | P1 | P2-P6 | P7 | P1 | P2-P6 | P7 | | | |
| WRITTEN WORD LINE POSITION | OPEN WL0-56 | | | EDGE WL | | | INNER WL | | | EDGE WL | | | OPEN WL57-116 | | |
| WL INDEX | | | | | | | | | | | | | | | |
| 0 | | | | | | | | | | | | | | | |
| ...... | | | | | | | | | | | | | | | |
| 56 | | | | | | | | | | | | | | | |
| 57 | | | | | | | | | | | | | | | |
| ...... | | | | | | | | | | | | | | | |
| 116 | | | | | | | | | | | | | | | |
| 117 | | | | | | | | | | | | | | | |
| ...... | | | | | | | | | | | | | | | |
| 172 | | | | | | | | | | | | | | | |
| ...... | | | | | | | | | | | | | | | |
| 230 | | | | | | | | | | | | | | | |
| 231 | | | | | | | | | | | | | | | |

FIG. 12C

MEMORY SYSTEM AND OPERATION METHOD THEREOF, AND READABLE STORAGE MEDIUM

CROSS-REFERENCE TO RELATED APPLICATIONS

The present application claims priority to Chinese Patent Application No. 2023108376746, which was filed Jul. 7, 2023, is titled "MEMORY SYSTEM AND ITS OPERATING METHOD, READABLE STORAGE MEDIUM," and is hereby incorporated herein by reference in its entirety.

TECHNICAL FIELD

The present disclosure relates to the technical field of semiconductor technique, in particular to a memory system and operation method thereof and a readable storage medium.

BACKGROUND

Memory device is a storage device used for storing information in modern information technology. As a typical nonvolatile semiconductor memory, NAND (Not-And) memory has become the mainstream product in the memory market due to its high storage density, controllable production cost, suitable erasing speed and retention characteristics.

SUMMARY

According to one aspect of examples of the present disclosure, a memory system is provided, comprising: a memory device comprising a plurality of memory blocks, each of which comprises a plurality of word lines and a plurality of memory cells coupled to the plurality of word lines; a memory controller coupled to the memory device and configured to: acquire a read retry voltage with a first-type read retry table and a second-type read retry table both; the first-type read retry table includes first voltage offset values corresponding to different situations when one of the plurality of memory blocks is closed; the second-type read retry table includes second voltage offset values corresponding to states for the respective word lines when one of the plurality of memory blocks is open, based on the first-type read retry table; and control the memory device to perform a read retry operation with the read retry voltage.

In some examples, the memory block comprises a first memory block which an open block, and the memory controller is configured to: obtain the first voltage offset value corresponding to the first memory block with the first-type read retry table; obtain a corresponding second voltage offset value with the second-type read retry table and by referring to a group to which the word line coupled to the memory cell to be read in the first memory block belongs and a relationship between the word line coupled to the memory cell to be read and a first blank word line; and obtain the read retry voltage for performing a read operation on the memory cell to be read in the first memory block, according to the first voltage offset value and the second voltage offset value. In some examples, the memory controller is configured to: obtain a total offset voltage value by summing the first voltage offset value and the second voltage offset value; and obtain the read retry voltage by summing a default read voltage and the total offset voltage value.

In some examples, the memory block comprises word line 0 to word line N which are numbered sequentially according to physical locations; the memory block is programmed in the order from the word line 0 to word line N, wherein N is an integer greater than 2; all the word lines of the memory block are divided into a plurality of groups, each of the groups includes a plurality of adjacent word lines; and all the word lines in the first memory block include: a first blank word line, an edge word line adjacent to the first blank word line, and an inner word line spaced from the first blank word line with a distance. The edge word line when falling into different groups has different second voltage offset values, and the inner word line when falling into different groups has different second voltage offset values.

In some examples, the edge word line and the inner word line, when falling into the same group, have different second voltage offset values.

In some examples, the number of the word lines included in each of the groups is same or similar.

In some examples, the shorter the distance between the inner word line and the word line 0 is, the greater the absolute value of the offset between the second voltage offset value corresponding to the inner word line which falls into a corresponding group and the first voltage offset value is; the shorter the distance between the edge word line and the word line 0 is, the greater the absolute value of the offset between the second voltage offset value in the second-type read retry table corresponding to the edge word line which falls into the corresponding group and the first voltage offset value is; and when the edge word line and the inner word line fall into the same group, the absolute value of the offset between the second voltage offset value corresponding to the edge word line and the first voltage offset value is greater than the absolute value of the offset between the second voltage offset value corresponding to the inner word line and the first voltage offset value.

In some examples, the memory cell comprises a multi-bit memory cell, the multi-bit memory cell reads multi-bit memory data through multi-stage read voltages. The second voltage offset values corresponding to read voltages for respective stages in the multi-stage read voltages are the same; or the second voltage offset values corresponding to read voltages for a portion of stages in the multi-stage read voltages are different.

In some examples, the second voltage offset values corresponding to read voltages for at least two stages in the multi-stage read voltages are different. The multi-stage read voltages are divided into a plurality of sections, each of which includes read voltages for one stage or read voltages for adjacent multiple stages. The second voltage offset values corresponding to read voltages for respective stages in one of the sections are the same, and the second voltage offset values corresponding to the multi-stage read voltages in different ones of the sections are different.

In some examples, each of the groups corresponds to the plurality of sections; for the plurality of different sections corresponding to one group, the smaller the average number of the stages for the read voltages included in a corresponding section is, the greater the absolute value of the offset between the second voltage offset value corresponding to the corresponding section and the first voltage offset value is.

In some examples, the memory device comprises multiple types of memory pages; the different situations include at least one of the following: different number of storage bits included in the memory cell; different types of the memory pages; or different usage scenarios of the memory device.

In some examples, the memory controller is configured to: after performing the read retry operation, perform a hard decode operation on the data which the read retry operation has been performed on; perform a soft decode operation in response to a failure of the hard decode operation; and perform a redundant array data recovery operation in response to a failure of the soft decode operation.

According to the second aspect of the examples of present disclosure, a method of operating a memory system is provided, comprising: acquiring a read retry voltage with both a first-type read retry table and a second-type read retry table; the first-type read retry table includes first voltage offset values corresponding to different situations when one of a plurality of memory blocks in a memory device is closed; the second-type read retry table includes second voltage offset values corresponding to states for respective word lines when one of the plurality of memory blocks is open, based on the first-type read retry table; and performing a read retry operation with the read retry voltage.

In some examples, the memory block comprises a first memory block which is an open block, acquiring a read retry voltage with both a first-type read retry table and a second-type read retry table further comprises: obtaining the first voltage offset value corresponding to the first memory block with the first-type read retry table; obtaining a corresponding second voltage offset value with the second-type read retry table and by referring to a group to which the word line coupled to the memory cell to be read in the first memory block belongs and the relationship between the word line coupled to the memory cell to be read and the first blank word line; and obtaining the read retry voltage for performing a read operation on the memory cell to be read in the first memory block according to the first voltage offset value and the second voltage offset value.

In some examples, obtaining the read retry voltage for performing a read operation on the memory cell to be read in the first memory block according to the first voltage offset value and the second voltage offset value further comprises: obtaining a total offset voltage value by summing the first voltage offset value and the second voltage offset value; and obtaining the read retry voltage by summing a default read voltage and the total offset voltage value.

In some examples, the memory block comprises word line 0 to word line N which are numbered sequentially according to physical location; the memory block is programmed in the order from the word line 0 to the word line N, wherein N is an integer greater than 2; and all the word lines included in the memory block are divided into a plurality of groups, each of the groups includes a plurality of adjacent word lines. All the word lines in the first memory block include: the first blank word line, an edge word line adjacent to the first blank word line, and an inner word line spaced from the first blank word line with a distance; wherein the edge word line when falling into different groups has different second voltage offset values, and the inner word line when falling into different groups has different second voltage offset values.

In some examples, the edge word line and the inner word line, when falling into the same group, have different second voltage offset values.

In some examples, the number of the word lines included in each of the groups is same or similar.

In some examples, the shorter the distance between the inner word line and the word line 0 is, the greater the absolute value of the offset between the second voltage offset value corresponding to the inner word line which falls into the corresponding group and the first voltage offset value is; the shorter the distance between the edge word line and the word line 0 is, the greater the absolute value of the offset between the second voltage offset value in the second-type read retry table corresponding to the edge word line which falls into the corresponding group and the first voltage offset value is; and when the edge word line and the inner word line fall into the same group, the absolute value of the offset between the second voltage offset value corresponding to the edge word line and the first voltage offset value is greater than the absolute value of the offset between the second voltage offset value corresponding to the inner word line and the first voltage offset value.

In some examples, the memory cell comprises a multi-bit memory cell, the multi-bit memory cell reads multi-bit memory data through multi-stage read voltages. The second voltage offset values corresponding to read voltages for respective stages in the multi-stage read voltages are the same; or the second voltage offset values corresponding to read voltages for a portion of stages in the multi-stage read voltages are different.

In some examples, the second voltage offset values corresponding to read voltages for at least two stages in the multi-stage read voltages are different. The multi-stage read voltages are divided into a plurality of sections, each of which includes read voltages for one stage or read voltages for adjacent multiple stages; and the second voltage offset values corresponding to read voltages for respective stages in one of the sections are the same, and the second voltage offset values corresponding to the multi-stage read voltages in different ones of the sections are different.

In some examples, each of the groups corresponds to a plurality of sections; for the plurality of different sections corresponding to one group, the smaller the average number of the stages for the read voltages included in a corresponding section is, the greater the absolute value of the offset between the second voltage offset value corresponding to the corresponding section and the first voltage offset value is.

In some examples, the memory device comprises multiple types of memory pages; the different situations include at least one of the following: different number of storage bits included in the memory cell; different types of the memory pages; or different usage scenarios of the memory device.

In some examples, the method further comprising: after performing the read retry operation, performing a hard decode operation on the data which the read retry operation has been performed on; performing a soft decode operation in response to a failure of the hard decode operation; and performing a redundant array data recovery operation in response to a failure of the soft decode operation.

According to the third aspect of the examples of present disclosure, a readable storage medium is provided, on which a computer program is stored, when executed, the computer program performs the method of any one of above examples.

BRIEF DESCRIPTION OF THE DRAWINGS

FIG. 8 is a schematic diagram of a read retry table according to an example of the present disclosure.

FIG. 10 is a schematic diagram of a first-type read retry table corresponding to a closed block according to an example of the present disclosure.

FIG. 12A is a schematic diagram of a second-type read retry table according to an example of the present disclosure.

FIG. 12B is another schematic diagram of a second-type read retry table according to an example of the present disclosure.

FIG. 12C is a schematic diagram of a second-type read retry table with sections divided for storage states according to an example of the present disclosure.

Figure 1:
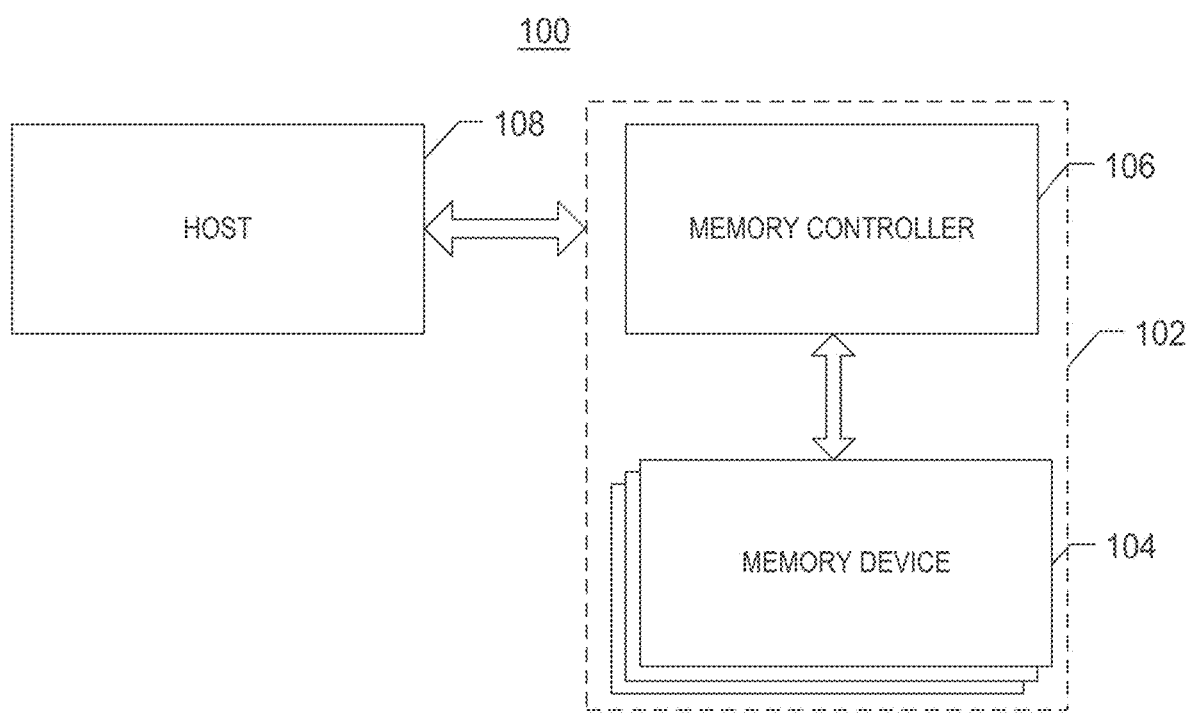
FIG. 1 is a schematic diagram of an example system having a memory system according to an example of the present disclosure.

Similar reference numerals in the above drawings (which are not necessarily drawn to scale) may describe similar components in different views. Similar reference numerals with different letter suffixes may denote different examples of similar components. The drawings generally illustrate, by way of example and not limitation, various examples discussed herein.

DETAILED DESCRIPTION

The examples of this disclosure will be described below in conjunction with the accompanying drawings. Although examples of the present disclosure are shown in the accompanying drawings, the present disclosure may be implemented in various forms and should not be limited by the specific examples set forth herein. Rather, these examples are provided to enable a more thorough understanding of the disclosure and to fully convey the scope of the disclosure to those skilled in the art.

Details are given in the following description to provide a more thorough understanding of the disclosure. However, it will be apparent to those skilled in the art that the present disclosure may be practiced without one or more of these details. Some technical features well known in the art are not described in other examples to avoid confusion with the present disclosure. For example, not all features of the actual examples are described herein, and the well-known functions and structures are not described in detail.

The sizes of the layers, regions, elements and their relative sizes may be exaggerated in the drawings for clarity. Throughout the description, the same reference numerals denote the same elements.

When an element or layer is referred to as "on", "adjacent to", "connected to" or "coupled to" another element or layer, it may be directly on, adjacent to, connected to or coupled to another element or layer, or there may be intervening elements or layers therebetween. Conversely, when an element is referred to as "directly on", "directly adjacent to", "directly connected to" or "directly coupled to" another element or layer, there are no intervening elements or layers therebetween. Although the terms "first", "second", "third", etc. may be used to describe various element, component, area, layer and/or part, these element, component, area, layer and/or part should not be limited by these terms. These terms are used only to distinguish one element, component, area, layer or part from another element, component, area, layer or part. Thus the first element, component, area, layer or part discussed below may be represented as the second element, component, area, layer or part without departing from the teachings of the present disclosure. The discussion of a second element, component, area, layer or part does not imply that the present disclosure must has a first element, component, area, layer or part.

The spatial relation terms such as "below", "under", "down", "beneath", "over" and the like may be used herein for convenience to describe the relationship of one element or feature shown in the drawing to other elements or features. The spatial relationship terms are intended to include different orientations of devices in use and operation in addition to the orientations shown in the figures. For example, if the device in the drawings is flipped, the elements or features described as "under" or "below" or "beneath" other elements or features will be oriented "on" other elements or features. Thus the exemplary terms "below" and "under" may include both up and down orientations. The device may be additionally oriented (rotated 90 degrees or other orientations) and the spatial terms used herein are explained accordingly.

The terms used herein are only for the purpose of describing specific examples and are not a limitation of the present disclosure. As used herein, the singular forms of "a", "an" and "said/the" are also intended to include the plural forms unless the context clearly indicates otherwise. The terms "composing of" and/or "including" when used in this specification determine the presence of said feature, integer, step, operation, element and/or components, but do not exclude the presence or addition of one or more other feature, integer, step, operation, element, component and/or group. As used herein, the term "and/or" includes any and all combinations of related listed sub-tables.

To enable a more detailed understanding of the features and technical aspects of the examples of the present disclosure, the examples of the present disclosure is set forth in detail below in conjunction with the accompanying drawings, which are attached for illustration only and are not intended to limit the examples of the present disclosure.

References to "an example" or "one example" throughout the specification mean that particular features, features or characteristics related to the examples are included in at least one example of the present disclosure. Thus, the phrase "in an example" or "in one example" appearing throughout the specification do not necessarily refer to the same example. In addition, these particular features, structures or characteristics may be combined arbitrarily and suitably in one or more examples. In various examples of the present disclosure, the sequence numbers of the above processes does not mean the order of execution, which should be determined by their functions and inherent logic, and should not constitute any limitation on the examples the present disclosure. Numbering of examples of present disclosure are for description only and do not represent the advantages and disadvantages of the example.

The method disclosed in examples of present disclosure may be arbitrarily combined to get new method examples without conflict.

The memory device in examples of the present disclosure includes, but not limited to, a three-dimensional (3D) NAND type memory. Taking the 3D NAND type memory as an example to illustrate this application for case of understanding.

FIG. 1 illustrates a memory block diagram of an exemplary system 100 having a memory device in accordance with some aspects of the present disclosure. System 100 may be a mobile phone, desktop computer, laptop computer, tablet computer, vehicle computer, game console, printer, positioning device, wearable electronic device, smart sensor, virtual reality (VR) device, augmented reality (AR) device, or any other electronic device having memory therein. System 100 as shown in FIG. 1 may include a host 108 and a memory system 102 having one or more memory devices 104 and a memory controller 106. The host 108 may be a processor of an electronic device (e.g., central processing unit (CPU)) or a system-on-chip (SoC) (e.g., application processor (AP)). The host 108 may be configured to send data to or receive data from memory device 104.

According to some examples, the memory controller 106 is coupled to the memory device 104 and the host 108, and is configured to control the memory device 104. The memory controller 106 may manage data stored in the memory device 104, and communicate with the host 108. In some examples, the memory controller 106 is designed to operate in low duty cycle, such as a secure digital (SD) card, compact flash (CF) card, universal serial bus (USB) flash drive or other media used in electronic devices such as personal calculators, digital cameras, mobile phones, and the like. In some examples, the memory controller 106 is designed to operate in a high duty cycle SSD or embedded multimedia card (cMMC), which are used as a data store for devices such as smart phones, tablet computers, laptops, and the like, as well as enterprise memory arrays.

The memory controller 106 may be configured to control operations of the memory device 104, such as read, erase and program operations. The memory controller 106 may also be configured to manage various functions relating to data stored or to be stored in the memory device 104 including, but not limited to, bad memory block management, garbage collection, logic to physical address translation, wear leveling, and the like. In some examples, the memory controller 106 is further configured to process error correction codes (ECC) with respect to data read from or written to the memory device 104. The memory controller 106 may also perform any other function such as formatting the memory device 104. The memory controller 106 may communicate with an external device (e.g., host 108) according to a particular communication protocol. For example, the memory controller 106 may communicate with an external device through at least one of various interface protocols, such as USB protocol, MMC protocol, peripheral component interconnection (PCI) protocol, PCI express (PCI-E) protocol, advanced technology attachment (ATA) protocol, serial ATA protocol, parallel ATA protocol, small computer small computer interface (SCSI) protocol, enhanced small disk interface (ESDI) protocol, integrated drive electronics (IDE) protocol, Firewire protocol, and the like.

Figure 2B:
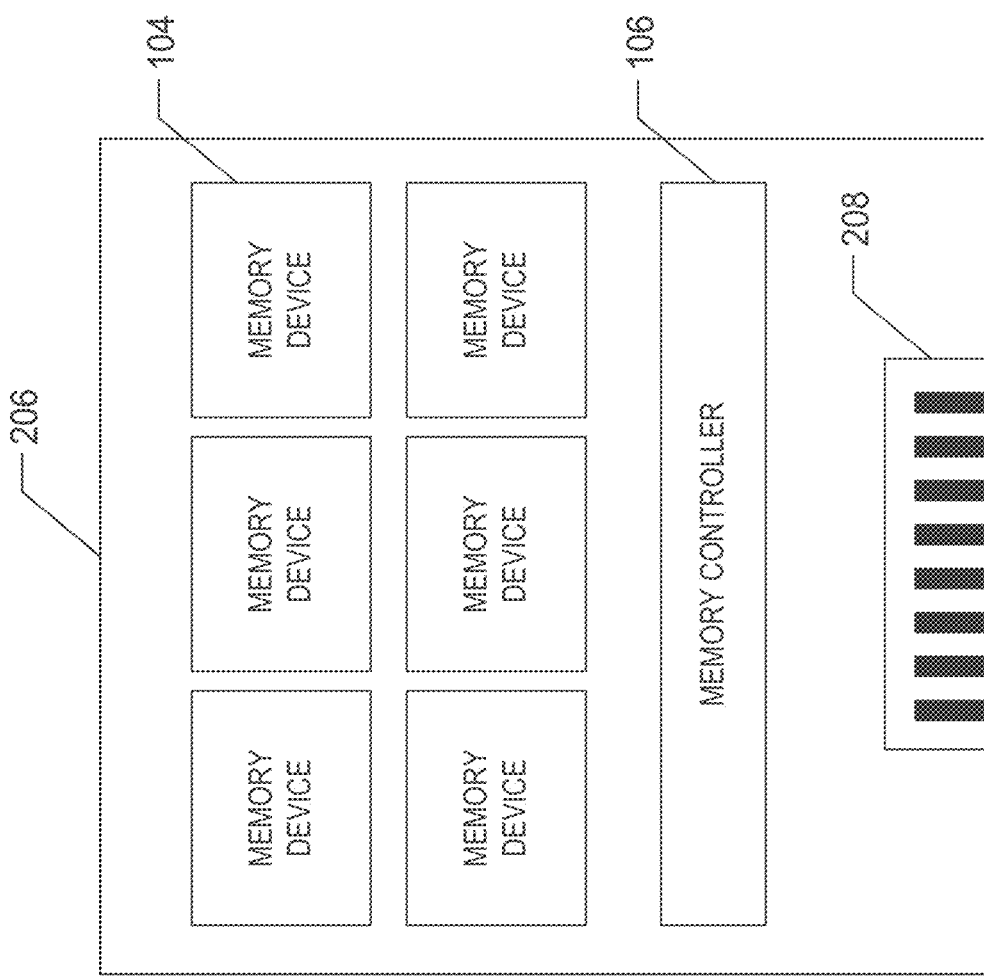
FIG. 2B is a schematic diagram of an example solid-state drive having a memory system according to an example of the present disclosure.
Figure 2A:
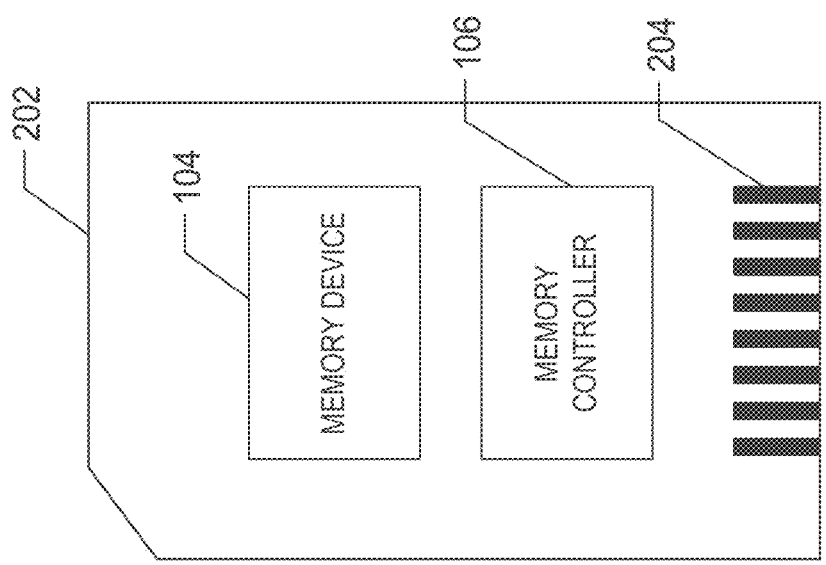
FIG. 2A is a schematic diagram of an example memory card having a memory system according to an example of the present disclosure.

The memory controller 106 and one or more memory devices 104 may be integrated into various types of memory devices, for example, in the same package (e.g., universal flash storage (UFS) package or eMMC package). That is, the memory system 102 may be implemented and encapsulated in different types of terminal electronic products. In one example as shown in FIG. 2A, the memory controller 106 and a single memory device 104 may be integrated into the memory card 202. The memory card 202 may include a PC card (PCMCIA, Personal Computer Memory Card International Association), a CF card, a smart media (SM) card, a memory stick, a multimedia card (MMC, RS-MMC, MMC-micro), an SD card (SD, miniSD, microSD, SDHC), a UFS, and the like. The memory card 202 may also include a memory card connector 204 that couples the memory card 202 to a host (e.g., host 108 in FIG. 1). In another example as shown in FIG. 2B, the memory controller 106 and a plurality of memory devices 104 may be integrated into the SSD 206. The SSD 206 may also include an SSD connector 208 that couples the SSD 206 to a host (e.g., host 108 in FIG. 1). In some examples, the storage capacity and/or operating speed of the SSD 206 is greater than those of the memory card 202.

Figure 3A:
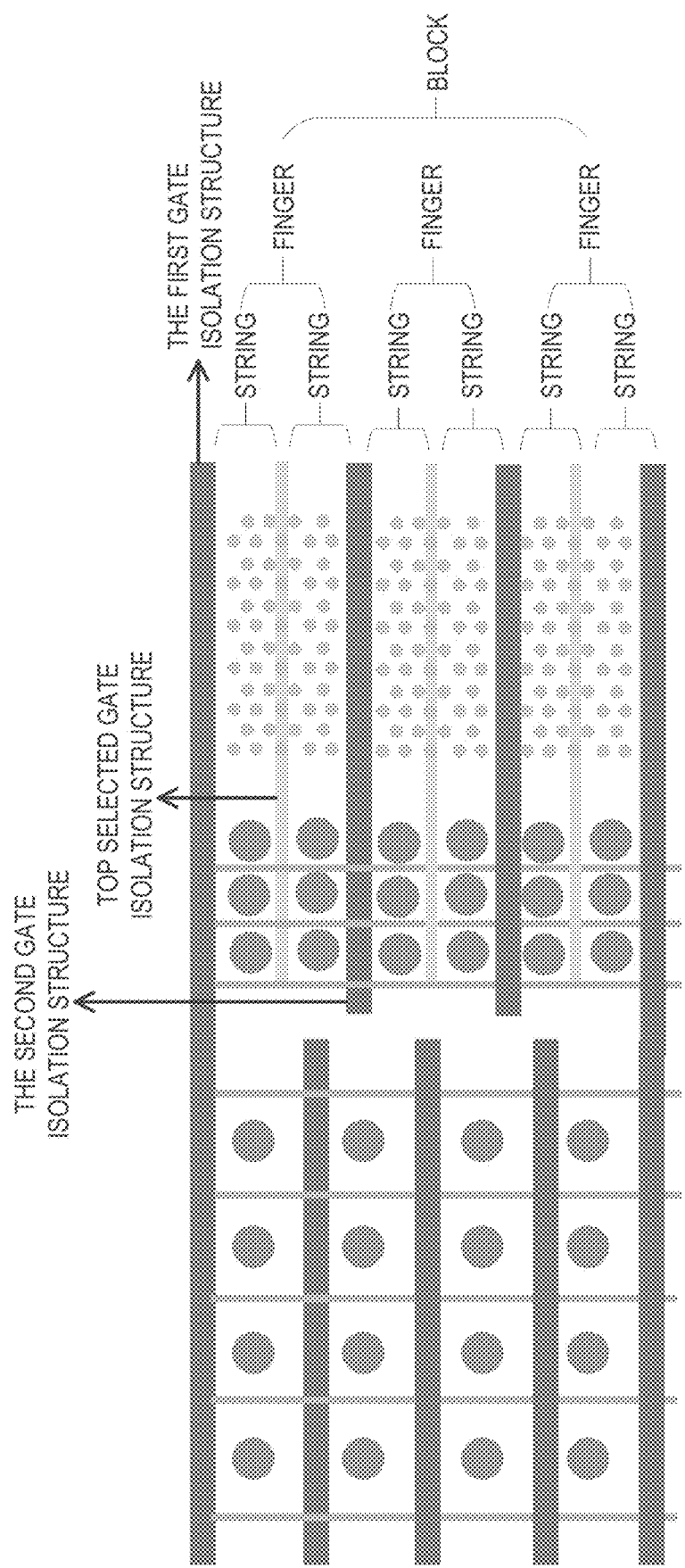
FIG. 3A is a schematic diagram of the distribution of memory cells of a three-dimensional NAND type memory according to an example of the present disclosure.

FIG. 3A exemplarily shows a structure schematic diagram of a memory cell array of 3D NAND type memory. As shown in FIG. 3A, the memory cell array of 3D NAND type memory is composed of a plurality of parallel staggered rows of memory cell rows parallel to the gate isolation structure. Every two rows of memory cell rows are separated by the gate isolation structure and the top selected gate isolation structure. Each of the memory cell rows includes a plurality of memory cells. The gate isolation structure may include a first gate isolation structure that divides the memory cell array into a plurality of memory blocks and a second gate isolation structure that divides the memory blocks into a plurality of fingers. The top selected gate isolation structure provided in the middle of each finger may divide the finger into two parts so as to divide the finger into two strings. One memory block shown in FIG. 3A includes six strings. The number of strings in one memory block in practice is not limited thereto. A memory cell in a memory block coupled by a word line may be called a page.

The number of memory cell rows between the gate isolation structure and the top selected gate isolation structure shown in FIG. 3A is an example only and is not intended to limit the number of memory cell rows included in one finger of the 3D NAND type memory in the present disclosure. In practice, the number of memory cell rows included in a finger may be adjusted according to the actual situation, such as 2, 4, 8, 16 and so on.

Figure 3B:
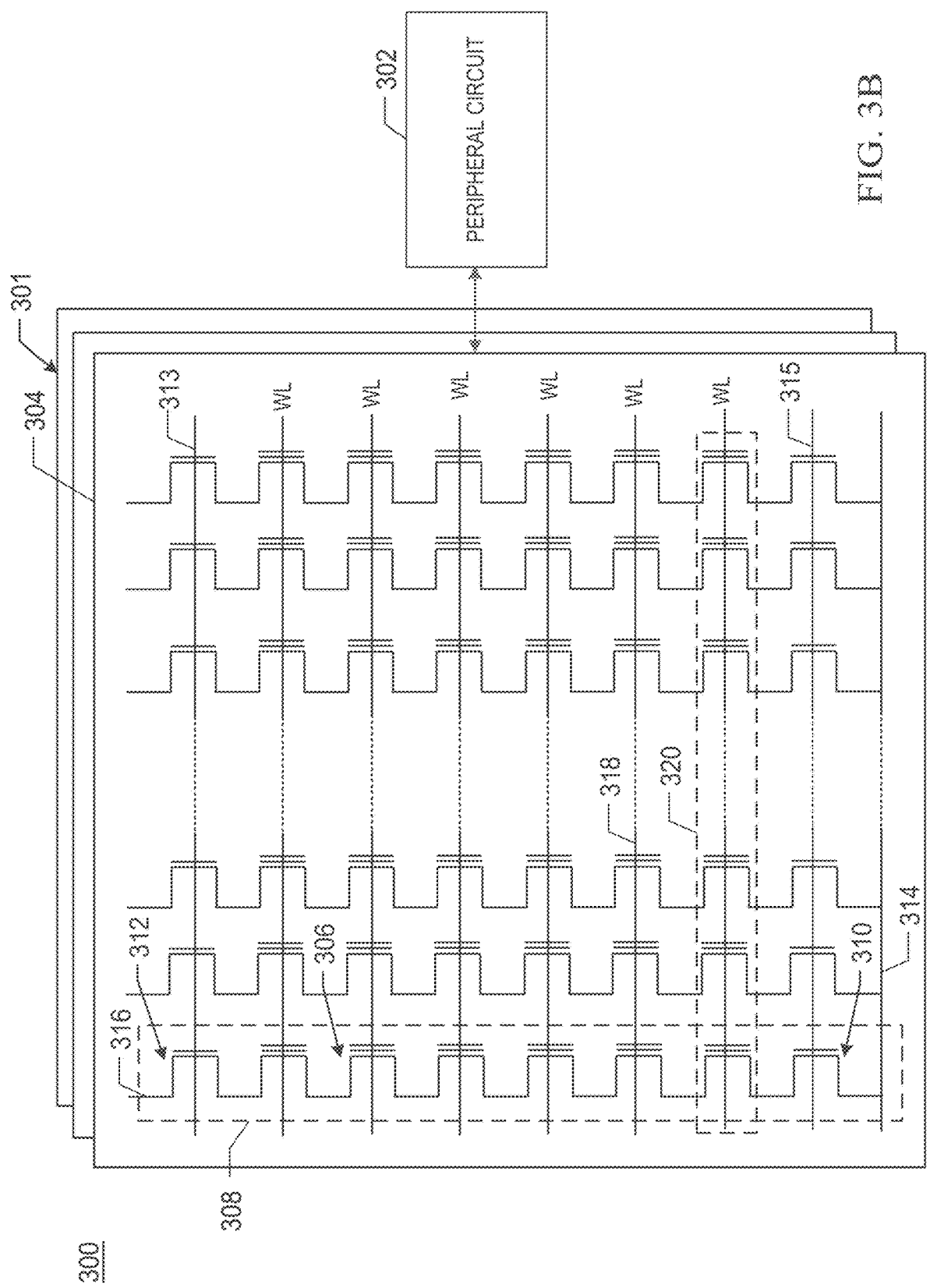
FIG. 3B is a schematic diagram of an example memory device including peripheral circuit according to an example of the present disclosure.

FIG. 3B shows a schematic circuit diagram of an exemplary memory device 300 including a peripheral circuit according to some aspects of the present disclosure. The memory device 300 may be an example of memory device 104 in FIG. 1. The memory device 300 may include a memory cell array 301 and a peripheral circuit 302 coupled to the memory cell array 301. The memory cell array 301 may be illustrated as a 3D NAND type memory array, in which memory cells 306 are provided in the form of an array of 3D NAND type memory strings 308, each extending vertically above a substrate (not shown). In some examples, each NAND memory string 308 includes multiple memory cells 306 coupled in series and stacked vertically. Each memory cell 306 can hold a continuous analog value, e.g., a voltage or charge, depends on the quantity of electrons trapped within an area of the memory cell 306. Each memory cell 306 may be a floating gate type memory cell including a floating gate transistor or a charge trapping type memory cell including a charge trapping transistor.

In some examples, each memory cell 306 may be a single level cell (SLC) with two possible storage states and therefore capable of storing one bit of data. For example, a first storage state "0" may correspond to a first voltage range, and a second storage state "1" may correspond to a second voltage range. In some examples, each memory cell 306 may be a multi-level cells (MLC) storing more than single bit of data in more than four storage states. For example, MLC can store two bits per cell and three bits per cell (also known as Triple-Level Cell (TLC)) or four bits per cell (also known as Quad-Level Cell (QLC)). Each MLC may be programmed to take a range of possible nominal stored values. In one example, if each MLC stores two bits of data, the MLC may be programmed to take one of three possible programming levels from the erasure state by writing one of three possible nominal stored values to the cell. The fourth nominal stored value may be used for the erasure state.

As shown in FIG. 3B, each memory string 308 may include a bottom selected gate (BSG) 310 at its source terminal and a top selected gate (TSG) 312 at its drain terminal. The BSG 310 and TSG 312 may be configured to activate the selected NAND memory string 308 during read and program operations. In some examples, the sources of the NAND memory strings 308 in the same memory block 304 are coupled by the same source line (SL) 314 (e.g., a common SL). In other words, according to some examples, all NAND memory strings 308 in the same memory block 304 may have an array common source (ACS). According to some examples, the TSG 312 of each memory string 308 is coupled to a corresponding bit line (BL) 316, from which bit line 316 data can be read or written via an output bus (not shown). In some examples, each memory string 308 is configured to be selected or deselected by applying a select voltage (e.g., higher than the threshold voltage of the transistor having the TSG 312) or a deselect voltage (e.g., 0V) to the respective TSG 312 via one or more TSG line 313 and/or by applying a select voltage (e.g., higher than the threshold voltage of the transistor having the BSG 310) or a deselect voltage (e.g., 0V) to the respective BSG 310 via one or more BSG lines 315.

As shown in FIG. 3B, the NAND memory strings 308 can be organized into a plurality of memory blocks 304, each of the plurality of memory blocks 304 can have a common source line 314 (e.g., coupled to ground). In some examples, each memory block 304 is a basic unit of data for an erase operation, i.e., all memory cells 306 on the same memory block 304 are erased at the same time. In order to erase the memory cells 306 in the selected memory block, the source lines 314 coupled to the selected memory blocks 304a and unselected memory blocks 304b on the same plane as the selected memory blocks 304a may be biased with an erase voltage (Vers) (e.g., high positive voltage (e.g., 20V or higher)). In some examples, the erase operation may be performed at a half memory block level, at a quarter memory block level, or at any suitable fraction of a number of memory blocks or memory blocks. The memory cells 306 of adjacent memory strings 308 can be coupled by word lines 318, the word lines 318 selecting which row of memory cells 306 is affected by read and program operations. In some examples, with reference to the above FIG. 3A, a plurality of memory cells separated by a top selected gate isolation structure and a gate isolation structure. A plurality of memory cells between the top selected gate isolation structure and the gate isolation structure are arranged in a plurality of memory cell rows, each parallel to the gate isolation structure and the top selected gate isolation structure. The memory cells in strings sharing the same word lines form a physical page 320. Each physical page 320 may be mapped to at least one logical page according to the storage mode (such as SLC or MLC as mentioned above) of the corresponding memory cell 306. The logical page may constitute a basic data unit for programming operations and reading operations.

Figure 4:
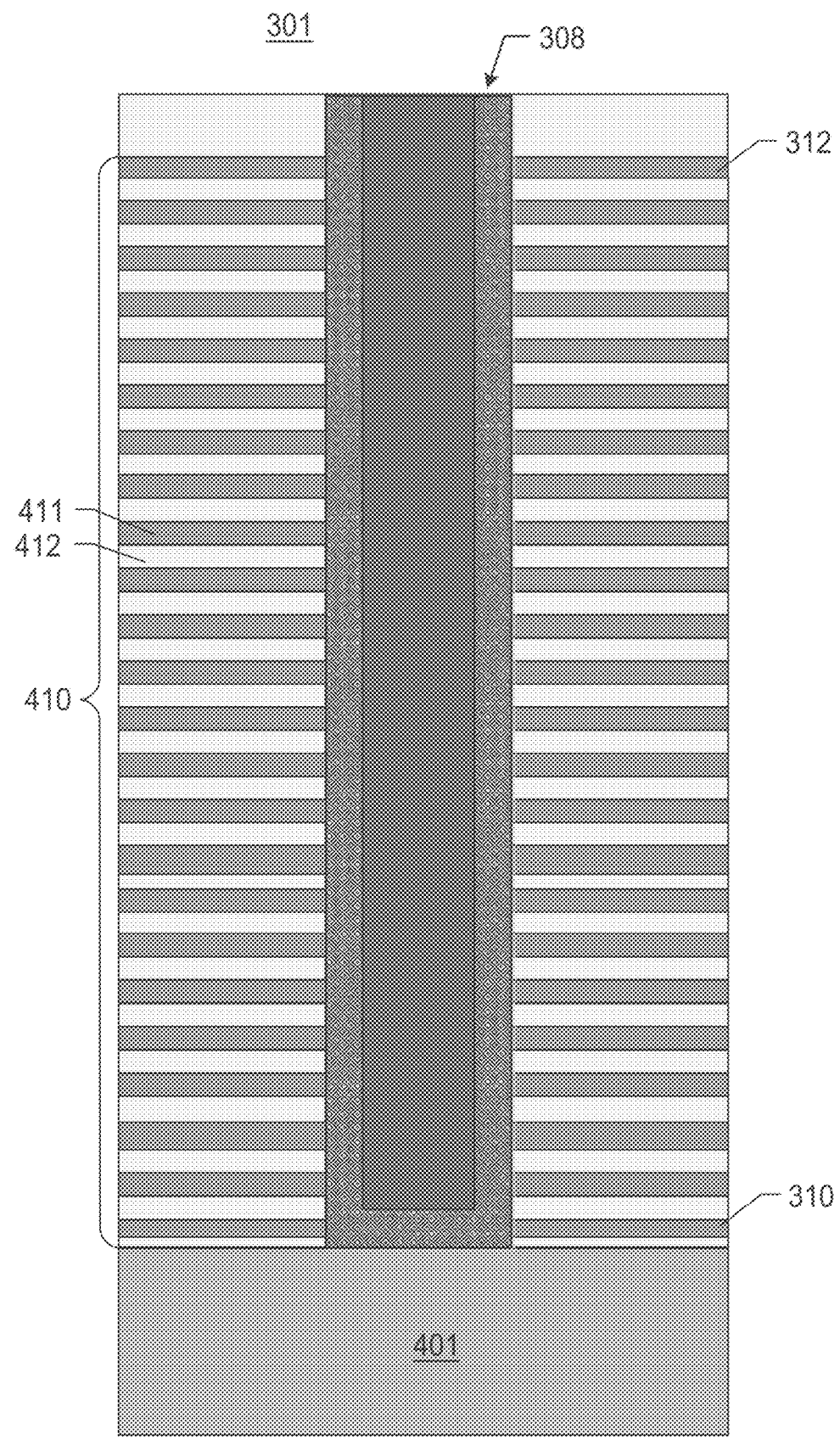
FIG. 4 is a schematic cross-sectional view of a memory array including NAND memory strings according to an example of the present disclosure.

FIG. 4 shows a schematic cross-sectional view of example memory cell array 301 including a NAND memory string 308 according to some aspects of the present disclosure. As shown in FIG. 4, the NAND memory string 308 may include a stack structure 410 including a plurality of gate layers 411 and a plurality of insulating layers 412 alternately stacked in turn and a memory string 308 perpendicularly penetrating the gate layers 411 and the insulating layers 412. The gate layer 411 and the insulating layer 412 may be alternately stacked. Two adjacent gate layers 411 are separated by an insulating layer 412. The number of memory cells included in the memory cell array 301 is determined by the number of pairs of gate layers 411 and insulating layers 412 in the stack structure 410.

The constituent material of the gate layer 411 may include a conductive material. The conductive material includes, but not limited to, tungsten (W), cobalt (Co), copper (Cu), aluminum (Al), polysilicon, doped silicon, silicide, or any combination thereof. In some examples, each gate layer 411 may include a metal layer, for example, a tungsten layer. In some examples, each gate layer 411 includes a doped polysilicon layer. Each gate layer 411 may include a control gate surrounding a memory cell. The gate layer 411 at the top of the stack structure 410 may extend laterally as a top selected gate line, and the gate layer 411 at the bottom of the stack structure 410 may extend laterally as a bottom selected gate line, and the gate layer 411 extending laterally between the top selected gate line and the bottom selected gate line may serve as a word line layer.

In some examples, a stack structure 410 may be disposed on a substrate 401. The substrate 401 may include silicon (e.g., monocrystalline silicon), silicon germanium (SiGe), gallium arsenide (GaAs), germanium (Ge), silicon on insulator (SOI), germanium on insulator (GOI) or any other material.

In some examples, the NAND memory string 308 includes a channel structure that extends vertically through the stack structure 410. In some examples, the channel structure includes a channel hole filled with a semiconductor material(s) (e.g., as a semiconductor channel) and a dielectric material(s) (e.g., as a memory film). In some examples, the semiconductor channel comprises silicon, such as polysilicon. In some examples, the memory film is a composite dielectric layer including a tunneling layer, a memory layer (also referred to as a "charge trapping/storage layer") and a barrier layer. The channel structure may have a cylindrical shape (e.g., a pillar shape). According to some examples, the semiconductor channel, the tunneling layer, the memory layer and the barrier layer are arranged radially from the center of the cylinder toward the outer surface of the cylinder in this order. The tunneling layer may include silicon oxide, silicon oxynitride, or any combination thereof. The memory layer may include silicon nitride, silicon oxynitride or any combination thereof. The barrier layer may comprise a silicon oxide, silicon oxynitride, high dielectric constant (high k) dielectric or any combination thereof. In one example, the memory film may include a composite layer of silicon oxide/silicon oxynitride/silicon oxide (ONO).

Figure 5:
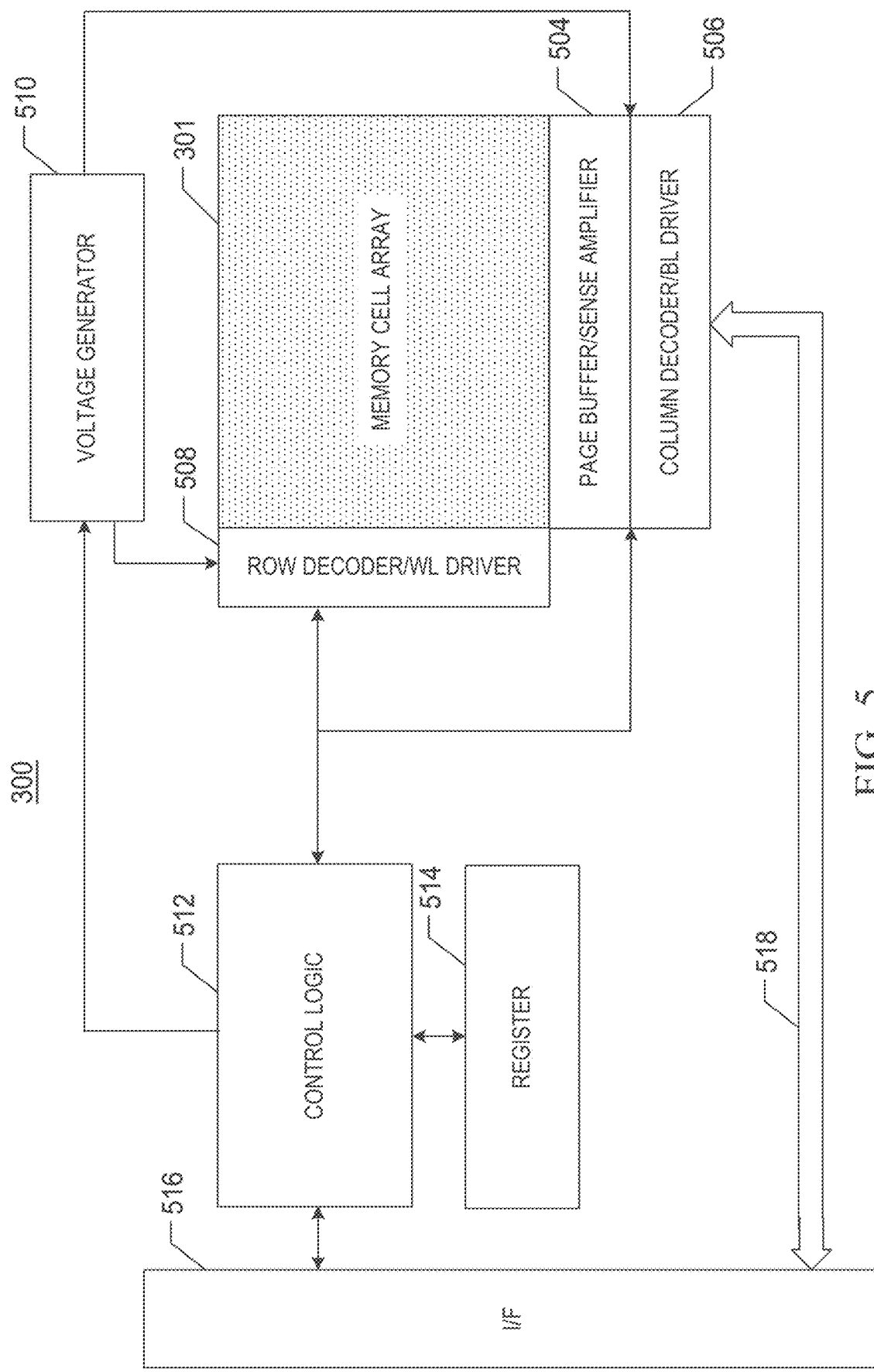
FIG. 5 is a schematic diagram of an example memory device including an array of memory cells and a peripheral circuit according to an example of the present disclosure.

Referring back to FIG. 3B, the peripheral circuit 302 may be coupled to the memory cell array 301 through the bit line 316, the word line 318, the source line 314, the BSG line 315, and the TSG line 313. The peripheral circuit 302 can include any suitable analog, digital, and mixed-signal circuit for facilitating operation of the memory cell array 301 by applying and sensing voltage and/or current signals to and from each target memory cell 306 via the bit line 316, the word line 318, the source line 314, the BSG line 315, and the TSG line 313. The peripheral circuit 302 can include various types of peripheral circuit formed with metal-oxide-semiconductor (MOS) technology. For example, FIG. 5 shows some example peripheral circuits. The peripheral circuit 302 can include a page buffer/sense amplifier 504, a column decoder/bit line driver 506, a row decoder/word line driver 508, a voltage generator 510, control logic 512, register 514, interface 516, and data bus 518. In some examples, additional peripheral circuits not shown in FIG. 5 may also be included.

The page buffer/sense amplifier 504 may be configured to read data from the memory cell array 301 and program (write) data to the memory cell array 301 based on a control signal from the control logic 512. In one example, the page buffer/sense amplifier 504 may store a page of program data (written data) to be programmed into one physical page 320 of the memory cell array 301. In another example, the page buffer/sense amplifier 504 may perform a program verify operation to ensure that data has been properly programmed into the memory cell 306 coupled to the selected word line 318. In yet another example, the page buffer/sense amplifier 504 may sense low power signals from the bit line 316 representing data bits stored in memory cells 306 and amplify small voltage swings to recognizable logic levels in a read operation. The column decoder/bit line driver 506 may be configured to be controlled by the control logic 512 and select one or more memory strings 308 by applying a bit line voltage generated from the voltage generator 510.

The row decoder/word line driver 508 can be configured to be controlled by the control logic 512 and to select/deselect a memory block 304 of the memory cell array 301 and to select/deselect a word line 318 of the memory block 304. The row decoder/word line driver 508 may also be configured to drive the word line 318 with the word line voltage generated from the voltage generator 510. In some examples, the row decoder/word line drivers 508 may also select/deselect and drive the BSG line 315 and TSG line 313. As described in detail below, the row decoder/word line driver 508 is configured to perform a program operation on the memory cells 306 coupled to the selected word line(s) 318. The voltage generator 510 may be configured to be controlled by the control logic 512 and generate a word line voltage (e.g., a read voltage, a program voltage, a pass voltage, a channel voltage, a verify voltage, etc.), a bit line voltage, and a source line voltage to be supplied to the memory cell array 301.

In some examples, the program operation may include a plurality of stages. As an example, the program operation may include a channel pre-charge stage, a channel boost stage, a program pulse stage and a recovery stage. In the channel pre-charge stage, the voltage generator may generate the voltage needed in the next stage, such as the voltage applied to each gate, the boost voltage. In the channel boost stage, a channel boost voltage may be applied to the selected word line. In the program pulse stage, the target voltage for each program may be applied to the selected word line. In the recovery stage, the voltages may be reduced to respective voltages, such as Vcc, Vdd, for unselected word line and the selected word line, by one or more stepped down steps. For example, the voltage may be reduced to an inner voltage and maintained for some period, and then reduced to the corresponding voltage.

The control logic 512 may be coupled to each of the peripheral circuits described above and configured to control the operations of each of the peripheral circuits. The register 514 may be coupled to the control logic 512 and include a status register, a command register and an address register for storing status information, a command operation code (OP code), and a command address for controlling the operation of each peripheral circuit. Interface 516 may be coupled to the control logic 512 and act as a control buffer to buffer and relay control commands received from a host (not shown) to the control logic 512 and to buffer and relay status information received from the control logic 512 to the host. The interface 516 may also be coupled to the column decoder/bit line drivers 506 via a data bus 518 and act as a data I/O interface and data buffer to buffer data and relay it to or from the memory cell array 301.

In some examples, the memory cells of NAND memory may be divided into single-level memory cell (one-bit memory cell), double-level memory cell (two-bit memory cell), triple-level memory cell (three-bit memory cell), quad-level memory cell (four-bit memory cell) and quinary-level memory cell (five-bit memory cell), according to storage density. However, regardless of single-level memory cell or multi-level memory cell, its read operation may be performed in units of pages. For example, when performing a read operation, a read voltage is applied to the word line (e.g., the selected word line) coupled to the selected page in the memory device 104. When the read voltage reaches the threshold voltage of a plurality of memory cells coupled to the selected word line, or the number of memory cells that have not reached the threshold voltage is within the allowable range, the read operation of the entire page ends. The memory cell may be an M-bit memory cell, and the memory cell has 2M storage states including an erasure state, and M-bit stored data is read through 2M−1 stage read voltages. For example, the first-stage read voltage is between the threshold voltages for the erasure state and the first storage state. When the first-stage read voltage is applied to the word line, the memory cell in the erasure state is turned on, and the memory cells in the first storage state are not turned on, the erasure state and the first storage state are distinguished and then read out.

During the read operation, the memory cells that have not reached the target threshold voltage are marked as error bits. In order to prevent read errors, an error correction code (ECC) is introduced. When the number of error bits is less than or equal to the maximum number of fail bits that can be corrected by the ECC, all error bits in the read operation can be corrected, so that the correct reading of data may be realized.

In some examples, the host 108 sends a read command (or a read instruction or a read request) to the memory controller 106 based on current user's command. The memory controller 106 transmits a read control command including information such as a logical to physical address mapping table to the memory device 104 through the interface 516, and controls the memory device 104 to perform a read operation on a memory cell corresponding to a corresponding physical address. The memory device 104 then transmits the read data to the memory controller 106 through the interface 516, and the memory controller 106 feeds back the data to the host 108 through an interface such as PCIe or SATA. In some examples, the memory controller 106 sends a read control command to the control logic of the memory device via the interface 516. The control logic applies a relevant operating voltage to the selected word line or bit line according to the relevant physical address to perform a read operation on the corresponding memory cell. The relevant operating voltage may be generated by voltage generator controlled by the control logic according to the associated read voltage mapping table, and is applied to the word line with corresponding address by the row decoder, or is applied to the bit line with corresponding address by column decoder.

Figure 6:
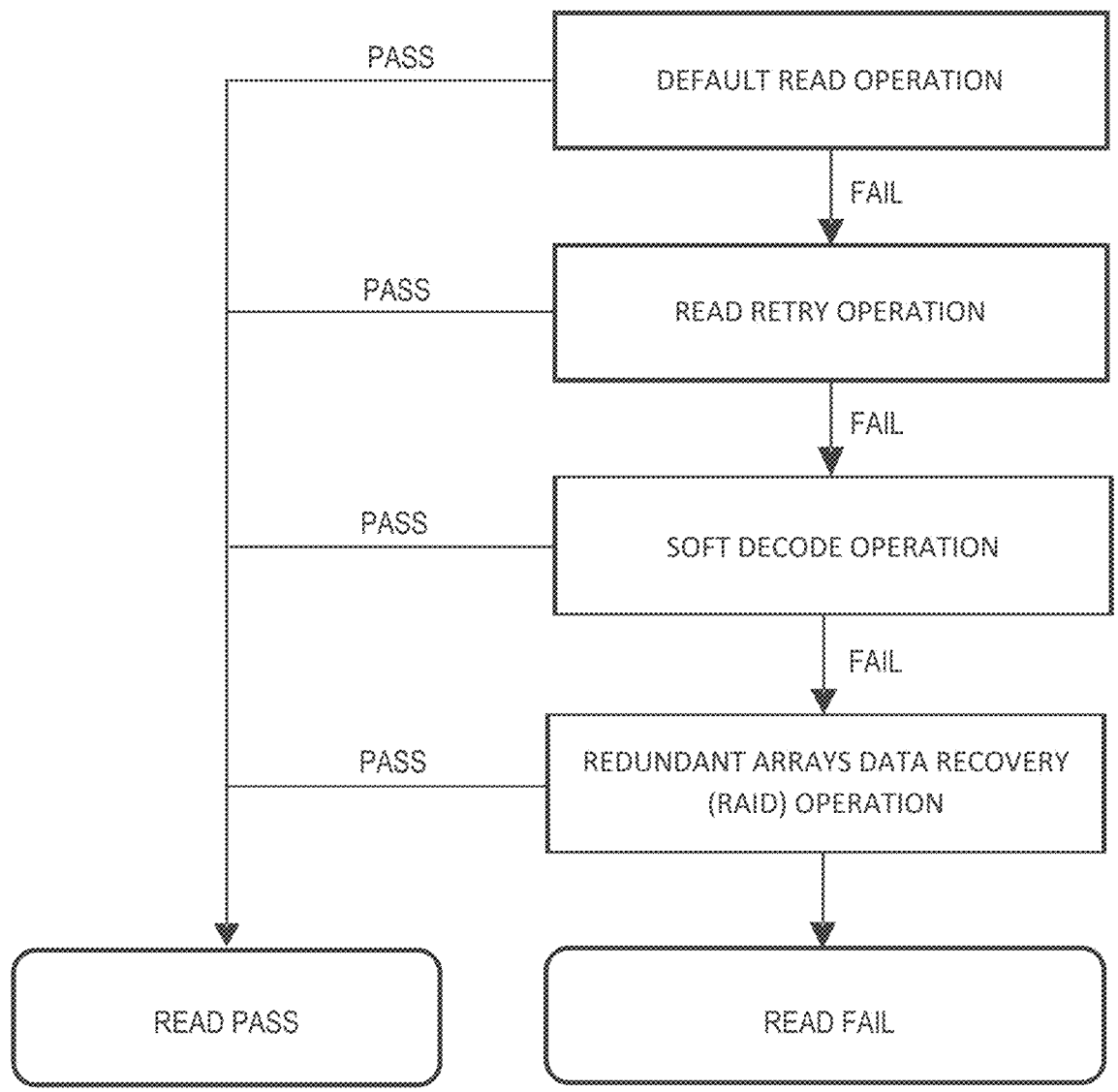
FIG. 6 is a schematic diagram of a read operation flow including a read retry operation according to an example of the present disclosure.

In other examples, a read error occurs when the memory device 104 reads a corresponding memory cell by the control of the memory controller 106. Here, in response to a failure of the read operation, the memory controller 106 controls the memory (or an error correction module in the memory controller 106) to correct the error. Error correction mode may include ECC error correction. According to some aspects of the examples of present disclosure, FIG. 6 illustrates a schematic diagram of an exemplary read operation flow of a memory system 102. As shown in FIG. 6, when the memory controller 106 controls the memory device 104 to perform a read operation, a default read operation (FW default read) is firstly performed on a memory cell at a corresponding physical address, then a read retry operation is performed if the default read operation fails, then a soft decode operation is performed if the read retry operation fails, and then a redundant array data recovery (RAID) operation is performed if the soft decode operation fails, then the read operation stops if the RAID operation fails, and the read fails due to the error which is incapable of being corrected. The memory controller 106 transmits a read failure signal to the host 108. The read retry operation and the default read operation may be applied to a hard decode operation.

Error correction operation such as read retry operation, soft decode operation and RAID operation may be performed by the memory device 104 controlled by an error correction module 1064 (e.g., ECC module) in the memory controller 106. A control command is sent by the memory controller 106 to the memory device 104 via an interface 516. The memory device 104 feeds back the read information to the memory controller 106 via an interface 516. If a read operation succeeds after performing any one of read retry operation, soft decode operation and RAID, then subsequent operations may be stopped.

In some examples, the soft decode operation may be considered as the followed operations: a re-decode operation is performed on data by a decoding component 1066 (e.g., a soft decoder) in the memory controller 106, and then a read operation is performed on the re-decoded data. The RAID operation may be considered as the followed operations: mirroring of data is performed by a second decoding, and the stored data and parity data thereof are reconstructed, wherein the re-encoding of stored data with a redundant array is performed in the data buffer 1067 of the memory controller 106

Figure 7:
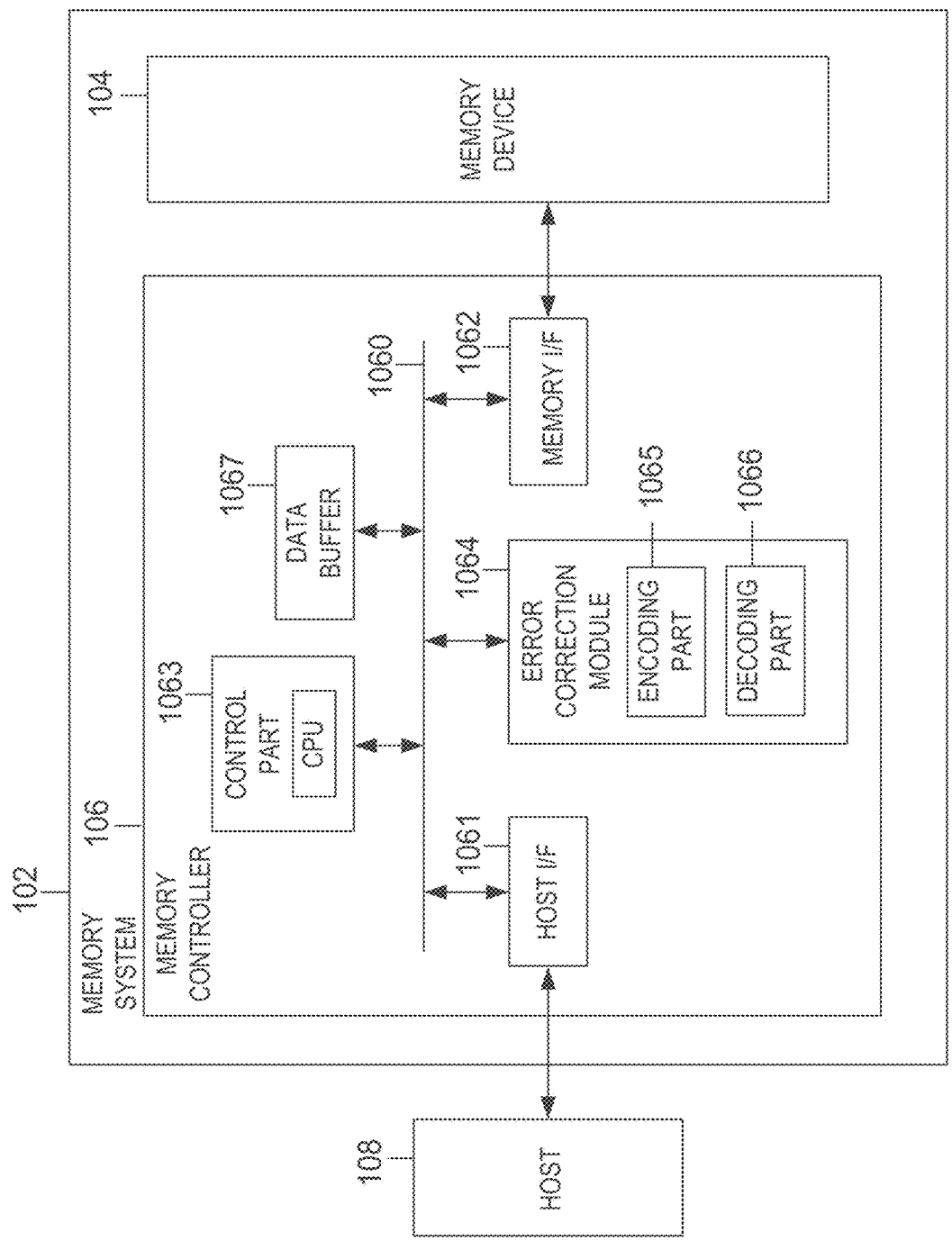
FIG. 7 is a memory block diagram illustrating an application of a memory controller including an error correction module in a memory system according to an example of the present disclosure.

According to some aspects of examples of present disclosure, FIG. 7 provides a memory block diagram of a memory system 102 including a memory controller 106 comprising an error correction module 1064. As shown in FIG. 7, the memory system 102 includes a memory controller 106 and a memory. The memory controller 106 may be coupled to a memory device 104 in any way. In the examples of the present disclosure, the memory controller 106 includes a host I/F 1061, a memory I/F 1062, a control component 1063, an error correction (ECC) module 1064, a data buffer 1067, and an internal bus 1060, wherein the error correction module 1064 includes an encoding component 1065 and a decoding component 1066. The host I/F 1061 outputs commands, user data (written data) and the like received from the host 108 to the internal bus 1060, and transmits the user data (read data) read from the memory device 104 and responses from the control component 1063 and the like to the host 108.

The memory I/F 1062 controls a process of writing user data or the like to the memory device 104 and a process of reading from the memory device 104 based on an instruction from the control component 1063. Overall, the control component 1063 controls the memory system 102. The control component 1063 is, for example, a central processor unit (CPU), a microprocessor (MPU), or the like. When a command is received from the host 108 via the host I/F 1061, the control component 1063 performs the control according to the command. For example, the control component 1063 instructs the memory I/F 1062 to write user data and parity check to the memory device 104 according to a command from the host 108. In addition, the control component 1063 instructs the memory I/F 1062 to read the user data and parity check from the memory device 104 according to the command from the host 108.

The error correction module 1064 includes an encoding component 1065 and a decoding component 1066. The encoding component 1065 encodes a predetermined size of user data to be written into the same page, to generate parity data. The parity data is written into the page in which the user data is written as the basis of the encoding, and is used to decode by the decoding component 1066. The data buffer 1067 temporarily stores user data received from the host 108 before being stored in the memory device 104, and temporarily stores data read from the memory device 104 before being transmitted to the host 108.

In some examples, the flow of determining the read retry voltage for the read retry operation of FIG. 6 may include: the error correction module 1064 in the memory controller 106 acquires a corresponding voltage offset value by querying a corresponding read retry table, the voltage offset value may be a positive or negative offset value, and obtaining a read retry voltage by summing the voltage offset value with the default read voltage. The memory controller 106 controls the memory device 104 to perform a read retry operation on a memory cell at a corresponding physical address with the read retry voltage. The memory controller 106 may query the read retry table in the way of polling. A read retry table may include a plurality of sub-tables, for example, m sub-tables (or multiple rows of RR setting entries in FIG. 8), wherein m is a natural number and greater than 1. Each sub-table may include a voltage offset value for a corresponding storage state of a corresponding memory cell. A query starts from a first sub-table to the m-th sub-table, one voltage offset value is obtained in one query, and then the voltage offset values are summed to obtain a read retry voltage. The memory device 104 performs a read operation with the read retry voltage. Therefore, for a single read retry operation, a sub-read operation may be performed m times at most, which is not limited in this example.

In some examples, a memory cell array may comprise a plurality of memory blocks, each of the memory blocks comprises a plurality of layers of word lines. A plurality of memory cells coupled to a certain layer of word lines in each of the memory blocks may be referred as one or more physical pages. In some examples, since the memory capacity requirements of the memory device 104 are increasing, the more the divided memory blocks are, the higher the integration density of memory string in total is, and the more the word line layers (corresponding to the number of memory cell stack layers) are. In the same word line layer, a difference of total amount of charges between a memory cell on a closed block and a memory cell on an open block on the same layer word line may exist due to offset of threshold voltages caused by some factors, such as the parasitic capacitance and charge coupling. The offset of threshold voltages is an example taken with the memory cells in the same storage state. The open block read the memory cells which have been written. Therefore, in some examples, the read retry table is set independently for the open block and the closed block. As shown in FIG. 6, the memory controller 106 queries a read retry table corresponding to a closed block when the default read operation which is performed on a logic page in a closed block fails. The memory controller 106 queries a read retry table corresponding to an open block when the default read operation which is performed a logic page in an open block fails. Even if the memory cells are in the same storage state and the same word line layer, the voltage offset values corresponding to the two read retry tables may be different.

There are blank word lines and written word lines for the open blocks. The blank word line may represent a word line coupled to the memory cells, each of which is in an erase state, for example, each of the states of the memory cells coupled to the blank word lines is erased state. The written word line may represent a word line coupled to the memory cells, not all of which are in an erased state (at least some memory cells are in a programmed state), for example, not all states of the memory cells coupled to the written word line are erased states. Based on the sequential programming, the first blank word line is the first one of all blank word lines according to the programming order.

In some examples, there are no blank word lines for a closed block. For different pages in the memory block, a read retry table may be used regardless of the word line position to reduce the size of the read retry table. There are blank word lines and written word lines for an open block. A difference for the number of charges between a physical page corresponding to a written word line and a physical page corresponding to a blank word line adjacent to the written word line May exist, which causes the threshold voltage offset between the threshold voltage of a memory cell in an open block and that in a closed block more complex. Further, the positional relationship between the written word line and the blank word line in the memory block also makes the threshold voltage offset more complex.

As an example, the top word line or the bottom word line may be taken as the word line from which the programming starts during a programming operation. The top word line and the bottom word line are respectively located at two opposite ends of a memory block (or a memory string). The top word line may be located at the end relatively close to the bit line and the bottom word line may be located at the end relatively far away from the bit line. The start word lines may be word line 0. The word lines may be sequentially numbered according to the programming order (the order in which programming voltages are applied), for example, word lines 0-63, word lines 0-95, word lines 0-127, word lines 0-230, word lines 0-400 or more. It may be sequentially written starting from word line 0 during the programming or writing, so that one single memory block may be closed to reduce the load for addressing. However, this is only for physical addresses and logical addresses do not limit their continuity. For the open block, the written word lines may correspond to continuous physical addresses. A first written word line in a plurality of written word lines which is adjacent to the first blank word line may be denoted as an edge word line and the remaining written word lines are denoted as inner word lines. In an example, taking word lines 0-230 as an example, when the written word lines are word lines 0-55, the inner word lines are word lines 0-54, and the edge word line is word line 55. When the written word lines are word lines 0-115, the inner word lines are word lines 0-114, and the edge word line is word line 115. The edge word line is the most adjacent to the first blank word line and is the most affected by the blank word line. The offset value of the threshold voltage corresponding to the edge word line is greater than the offset value of the threshold voltage corresponding to the inner word line. For an open block, the read retry table includes at least parts for the edge word line and the inner word line, respectively. In other words, the read retry table includes sub-tables for the edge word line and the inner word line respectively, to meet the offsets of different threshold voltages.

In some examples, for an open block, when the number for the word line is greater (the number of word line layers is more), the offset values of the threshold voltages which correspond to the edge word line and the inner word line at different positions are different. The word lines may be grouped, and each of the groups corresponds to different parts or different sub-tables in the read retry table. In the examples of the present disclosure, the management of the read retry tables for the closed block and the open block may include many situations: the various read retry tables corresponding to the closed block and the open block are combined into one primary read retry table which is managed as a whole; or, for different types of memory blocks, even for the grouped word lines different memory blocks, the read retry tables may be presented in read retry sub-tables, the way for managing read retry tables as a whole or separately is not limited in the examples of this disclosure. The subsequent firmware or program will query according to the grouping information attached to the read retry table and the position of the word line.

As an example, FIG. 8 illustrates a primary read retry table including an associated read retry table for a closed block. In FIG. 8, taking a TLC memory cell storing 3-bit data with 7-stage read voltages as an example, the header shows read retry voltage offset values corresponding to the read retry voltages for 7 storage states, including positive and negative values or 0, and a new read retry voltage is obtained by summing corresponding default read voltage and the offset value. The offset information includes word line address information, memory block type information, etc. Based on this information, the firmware may determine from which row of table the current read retry operation starts polling or which row of the read retry table is to be executed. The 7-stage read voltages are: Rd1LP, Rd2MP, Rd3UP, Rd4MP, Rd5LP, Rd6MP, Rd7UP. When the memory cell to be performed a read retry operation is in a closed block, the parts in the read retry table to be polled may include RR-1, RR-9 to RR-33, and are queried up to 26 times, the operation for voltage offset values is performed 26 times to determine whether the read retry operation passes. If any one of read retry operations passes, the poll may be stopped; if the operation is performed 26 times, the read retry operation is stilled not passed, it may be determined that the read retry operation fails, and the soft decoding operation is to be performed. In FIG. 8, the part of RR-34 to RR-188 is also included in the read retry table which is not shown and corresponds to the part in the read retry table corresponding to different groups of word lines in the open block. In some examples, taking RR-1 as an example, the voltage offset value obtained by one query for the first storage state is a1 (in unit of mv), a read retry voltage is obtained by summing a1 and the default read voltage corresponding to the first storage state, and the read retry operation is performed on the memory cell to determine whether the read operation is passed.

Taking the TLC memory cell with word lines 0-231 as an example, the first group includes word lines 0-56, the second group includes word lines 57-116, the third group includes word lines 117-172, and the fourth group includes word lines 173-230, the groups here include the written word lines, the inner word lines and the edge word line. As an example, when the written word lines which are word lines 0-57 fall into the second group, the word lines 0-56 still belong to the second group, and their voltage offset values are queried according to the lookup table of the second group. When the read retry table shown in FIG. 8 is queried during the read retry operation, when the written word line falls into the first group, for all the inner word lines, the part of RR-34 to RR-59 in the read retry table is polled, and for the voltage offset values, the query may be performed at most 26 times, wherein the 26 times may be the preset value written in the firmware. For the edge word line, the part of RR-112 to RR-137 in the read retry table is polled, and for the voltage offset values, the query may be performed at most 26 times. When the written word line falls into the second group, for all the inner word lines, the part of RR-60 to RR-85 in the read retry table is polled, for the voltage offset values, the query may be performed at most 26 times. For the edge word line, the part of RR-138 to RR-163 in the read retry table is polled, for the voltage offset values, the query may be performed at most 26 times. When the written word line falls into the third group, for all the inner word lines, the part of RR-86 to RR-111 in the read retry table is polled, for the voltage offset values, the query may be performed at most 26 times. For the edge word line, the part of RR-164 to RR-189 in the read retry table is polled, for the voltage offset values, the query may be performed at most 26 times. When the written word line falls into the fourth group, for the inner word lines, the part corresponding to the closed block in the read retry table is polled, for the voltage offset values, the query may be performed at most 26 times. For the edge word line, the part of RR-34 to RR-59 is polled, for the voltage offset values, the query may be performed at most 26 times. When the written word line falls into the fourth group, the case that inner word line and the edge word line are the same as those in other groups is special, and in other examples, they may be different.

In some examples of read retry operations, the number of times for performing the read retry operation is illustrated as an example to explain the correspondence between the group of the word line and the read retry table according to the examples of the present disclosure. When the written word lines are word lines 0-10 and fall into the first group, wherein the inner word lines are word lines 0-9, and the part of RR-34 to RR-59 is polled; the edge word line is 10, and the part of RR-112 to RR-137 is polled. When the written word lines are word lines 0-56 and fall into the first group, wherein the inner word lines are word lines 0-55, and the part of RR-34 to RR-59 in read retry table is polled; the edge word line is 56, and the part of RR-112 to RR-137 is polled. When the written word lines are word lines 0-57 and fall into the second group, the inner word lines are word lines 0-56, and the part of RR-34 to RR-59 is not polled, instead, the part of RR-60 to RR-85 is polled; for the edge word line, the part of RR-138 to RR-163. When the written word lines are word lines 0-117 and fall into the third group, the inner word lines are word lines 0-116, and for all the inner word lines, the part of RR-86 to RR-111 is polled; for the edge word line, the part of RR-164 to RR-189 is polled. In some examples, when the written word line is word line 0, each of the inner word line and the edge word line is word line 0. The threshold voltages for the first programming are offset more. The part of RR-34 to RR-59, the part of RR-112 to RR-137 may be partially polled, at most 52 times, to reduce the fail bit counts (FBC) and improve the read retry accuracy. When the word lines 0-231 all are closed, the memory block is a closed block. The table is polled for the closed block.

The read retry table in FIG. 8 also includes additional cases such as RR-2, RR-3 to RR-7 and RR-8. They may include some other test items, such as start-of-life test, end-of-life test for memory cell, which may be completed prior to the first poll. The RR-2 corresponds to a closed block, RR-3 to RR-7 correspond to inner word lines for the open block, and RR-8 corresponds to edge word line for the open block. For the number of rows included in the read retry table (or the read retry sub-table) in FIG. 8, the preset largest number of times of one poll for querying the table in one read retry operation (for example, 26 times) is an example only and not limited thereto. The greater the number of times of for querying the table in one read retry operation is, the less the FBC caused by the determined read retry voltage is, and the higher the read retry accuracy is.

Referring to FIG. 8, in order to overcome the influence of the inner word line and edge word line at different positions in the open block on the threshold voltage offset, the written word lines are grouped and provided with independent part in the read retry tables for polling. The poll items RR-1 to RR-189 are set, and the amount of data in the read retry table is large.

Further, in some other usage scenarios, there are other corresponding read retry tables including, but not limited to, the test items such as read disturbances; data retention; working life; and temperature. The different test items may be independently set with a read retry table similar to that shown in FIG. 8. Alternatively, the corresponding RR polling sub-tables may be added to further increase the size of the read retry table. Thus, the occupation of memory space is further increased, especially when starting the read retry operation, the occupation space of relevant registers or data buffers 1067 in the memory controller 106 is further increased. To a certain extent, data transmission pressure will be increased, and also the space for other data will be occupied, thus the data processing performance is reduced.

In view of this, a memory system 102 is provided according to a first aspect of the examples of the present disclosure, which comprises: a memory device 104 comprising a plurality of memory blocks, each of which comprises a plurality of word lines and a plurality of memory cells coupled to the plurality of word lines. A memory controller 106 is coupled to the memory device and configured to: acquire a read retry voltage with both a first-type read retry table and a second-type read retry table, the first-type read retry table includes first voltage offset values corresponding to different situations when one of the plurality of memory blocks is closed, the second-type read retry table includes second voltage offset values corresponding to states for respective word lines when one of the plurality of memory blocks is open, based on the first-type read retry table; control the memory device 104 to perform a read retry operation with the read retry voltage.

In the examples of the present disclosure, the read retry table corresponding to the closed block in FIG. 8 is as the reference read retry table, then the first-type read retry table shown in FIG. 10 may be obtained. The first-type read retry table may be a sub-table of the read retry table in FIG. 8. Based on the first-type read retry table in FIG. 10, the voltage offset may be used to construct the read retry table corresponding to the open block. The first-type read retry table maintains the part of RR-1, RR-9 to RR-33 for the closed block, and deletes the read retry table for the open block in the previous read retry table, and the parts of RR-2, RR-3 to RR-7 and RR-8 and other additional test cases that do not conform to the offset rule in FIG. 9. The offset voltage shown in FIG. 10 is denoted as a first voltage offset value. In some examples, the present disclosure is to test the threshold voltage for a plurality of closed blocks and the inner word line and edge word line in various situations for a plurality of open blocks.

Figure 9:
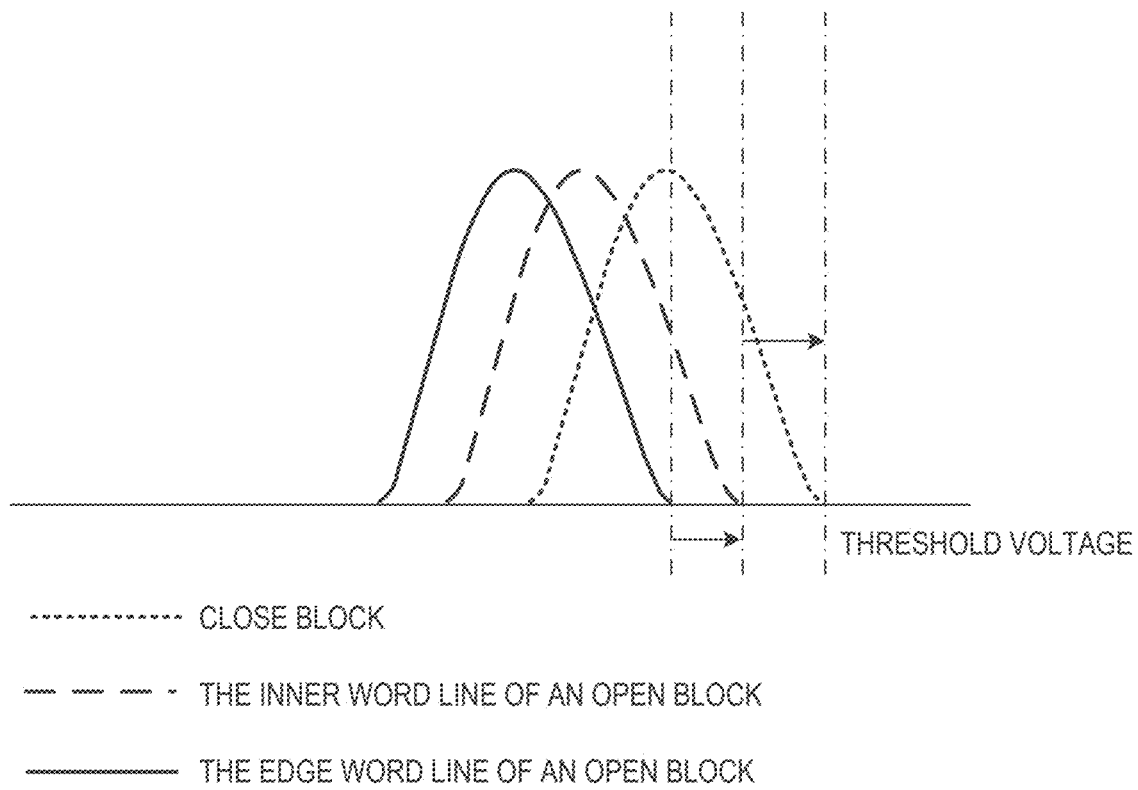
FIG. 9 is a schematic diagram of threshold voltage offsets of a closed block, an inner word line of an open block, an edge word line of an open block according to an example of the present disclosure.

Referring to FIG. 9, for the word lines with the same number or in the same word line layer coupled, the threshold voltage of a closed block whose position has less influence on the voltage offset may be as a reference, and the threshold voltage of the inner word line in the open block is offset by a first offset value relative to the threshold voltage of the closed block, and the threshold voltage of the edge word line in the open block is offset by a second offset value relative to the threshold voltage of the closed block. The second offset value is greater than the first offset value. For a memory cell with a small number of storage bits, such as TLC, the threshold voltages of inner word lines corresponding to all storage states are offset by a same first offset value, and the threshold voltages of edge word lines corresponding to all storage states are offset by a same second offset value. For a memory cell with a large number of storage bits, such as QLC or some TLCs, the threshold voltages of inner word lines corresponding to different storage states are offset by different first offset values, and the threshold voltages of edge word line corresponding to different storage states are offset by different second offset values. In view of this, a corresponding voltage may be offset on the basis of the read retry table corresponding to the closed block to construct the read retry table corresponding to the open block. The second voltage offset value in the second-type read retry table is set according to the offset relationship of the threshold voltage between the inner word line of the open block and the closed block in FIG. 9, and the offset relationship of the threshold voltage between the edge word line of the open block and the closed block, thereby the total size of the read retry table is reduced. For a closed block, the read retry voltage is obtained by summing the first voltage offset value and the default read voltage. For an open block, the read retry voltage is obtained by summing the first voltage offset value, the second voltage offset value and the default read voltage.

In some examples, the memory device 104 comprises multiple types of memory pages; the different situations include at least one of the following: different number of storage bits included in the memory cell, different types of the memory pages, or different usage scenarios of the memory device.

The memory cell may store M bits data in examples of the present disclosure. The memory device 104 may include M types of pages. The M-bit memory cell reads M-bit stored data through N-stage read voltages, wherein each of M, N is an integer and greater than 1, and N=2M−1.

When M=2, the stored data in the memory cell includes 2 bits. Here, the memory includes two types of pages, for example, an upper page and a lower page. The 2-bit memory cell requires 3-stage (e.g., 3=2*2−1) read voltages to read 2-bit stored data. As an example, 2-bit data stored in a memory cell corresponds to four states (an erase state and three storage states), e.g., four voltage ranges are assigned to four data values. The 2-bit stored data stored in the memory cell is read by applying 3-stage read voltages for distinguishing four voltage ranges at the time of reading. Wherein the upper page corresponds to read voltages for one stage and the lower page corresponds to read voltages for two stages.

When M=3, the stored data in the memory cell includes 3 bits. Here, the memory includes three types of pages, for example, the upper page, the middle page and the lower page. The 3-bit memory cell requires 7-stage (e.g., 7=2*3−1) read voltages to read 3-bit stored data. As an example, 3-bit data stored in a memory cell corresponds to eight states (an erase state and seven storage states), e.g., eight voltage ranges are assigned to eight data values. The 3-bit stored data stored in the memory cell is read by applying 7-stage read voltages for distinguishing eight voltage ranges at the time of reading. Wherein, the upper page corresponds to read voltages for two stages, the middle page corresponds to read voltages for three stages, and the lower page corresponds to read voltages for two stages. For example, in the read retry table illustrated in FIGS. 9 and 10, the 7-stage read voltages (Vrd1-7) of the seven storage states except the erase state are Rd1LP, Rd2MP, Rd3UP, Rd2MP, Rd5LP, Rd6MP, Rd7UP, respectively. The upper page corresponds to Rd3UP, the middle page corresponds to Rd2MP, Rd2MP and Rd6MP, and the lower page corresponds to Rd1LP and Rd5LP. The correspondence between the read voltage offset voltage for the corresponding stage in the read retry table and the memory pages of different types is the same as the correspondence between the read voltage and the memory pages, which is not repeated here.

When M=4, the stored data in the memory cell includes 4 bits. Here, the memory includes four types of pages, for example, the upper page, the middle-upper page, the middle-lower page and the lower page. The 4-bit memory cell requires 15-stage (e.g., 15=2*4−1) read voltages to read 4-bit stored data. As an example, 4-bit data stored in a memory cell corresponds to 16 states (an erase state and fifteen storage states), e.g., 16 voltage ranges are assigned to 16 data values. The 3-bit stored data stored in the memory cell is read by applying a 15-stage read voltages for distinguishing 16 voltage ranges at the time of reading. The upper page corresponds to read voltages for four stages, the upper-middle page corresponds to read voltages for three stages, the middle-lower page corresponds to read voltages for four stages, and the lower page corresponds to read voltages for four stages.

In some examples, the respective stage read voltage for distinguishing respective bit of stored data which corresponds to each type of page is determined according to encoding rules. As an example, the encoding rules include but are not limited to Gray code encoding rules. A typical binary Gray code may be referred to as Gray code for short. In the encoding of a set of numbers, if any two adjacent codes are only different in one binary number, this code is called Gray code. Further, since only one bit is different between the maximum number and the minimum number, e.g., end-to-end, it is called a cyclic code or a reflective code.

Figure 11:
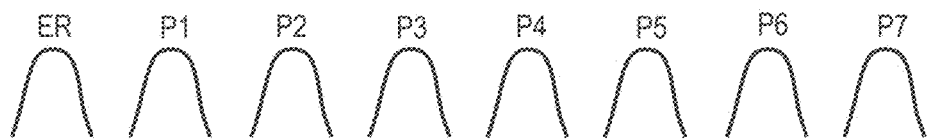
FIG. 11 is a schematic diagram of a threshold voltage after being programmed with Gray code according to an example of the present disclosure.

Gray code may be also in many other encoding forms, such as the formation of decimal number encoding, four-bit natural binary encoding form, etc. The Gray code is to produce a code table through recursion, for example, two-digit Gray code, three-digit Gray code, four-bit Gray code, etc. Referring to FIG. 11, take the three-dimensional Gray code as an example, such as 111, 110, 100, 000, 101, 011, 001, and 101, which correspond to the erase state (ER) and seven storage states (P1-P7), respectively. As mentioned above, 7-stage read voltages may be required to read eight voltage ranges corresponding to eight storage states (an erased state and seven storage states). In the examples of the present disclosure, three types of pages corresponding to the 3-bit memory cell respectively correspond to the 7-stage read voltages through the encoding rule of the three-bit Gray code. The lower page corresponds to the first-stage read voltage and the fifth-stage read voltage. The middle page corresponds to the second-stage read voltage, the fourth-stage read voltage, and the sixth-stage read voltage. The upper page corresponds to the third-stage read voltage and the seventh-stage read voltage. If the encoding rule changes, the corresponding stage may be also adjusted accordingly. Different usage scenarios include but are not limited to: read interference, data retention, working life, temperature and other test items. Different test items correspond to the read retry tables for a plurality of closed blocks, and also correspond to the read retry tables for a plurality of open blocks.

In some examples, the memory block comprises a first memory block which is an open block, and the memory controller 106 is configured to: obtain the first voltage offset value corresponding to the first memory block with the first-type read retry table, obtain the corresponding second voltage offset value with the second-type read retry table and by referring to a group to which the word line coupled to the memory cell to be read in the first memory block belongs and the relationship between the word line coupled to the memory cell to be read and the first blank word line, obtain the read retry voltage for performing a read operation on the memory cell to be read in the first memory block according to the first voltage offset value and the second voltage offset value.

In some examples, the memory controller 106 is configured to: obtain a total offset voltage value by summing the first voltage offset value and the second voltage offset value, obtain the read retry voltage by summing a default read voltage and the total offset voltage value. The default read voltage is the read voltage for performing the default read operation shown in FIG. 6.

For a closed block, a read retry voltage is obtained by summing a first voltage offset value and a default read voltage. For an open block, a read retry voltage is obtained by summing the first voltage offset value, the second voltage offset value and the default read voltage.

In some examples, the memory block comprises word line 0 to word line N which are numbered sequentially according to physical location. The memory block is programmed in the order from the word line 0 to the word line N, wherein N is an integer greater than 2. All the word lines of the memory block are divided into a plurality of groups, each of the groups includes a plurality of adjacent word lines. All the word lines in the first memory block include: a first blank word line, an edge word line adjacent to the first blank word line, and an inner word line spaced from the first blank word line with a distance, wherein the edge word line when falling into different groups has different second voltage offset values, and the inner word line when falling into different groups has different second voltage offset values.

In some examples, the number of the word lines included in each of the groups is same or similar.

In some examples, the edge word line and the inner word line, when falling into the same group, have different second voltage offset values.

The first memory block is an open block. When a read retry operation is performed, the first voltage offset value is obtained with the first-type read retry table set according to different conditions corresponding to the closed block shown in FIG. 10. As mentioned above, according to the method for numbering in the programming order and grouping of the word lines, the inner word lines and edge word line for a written word line may be determined by the distance between the word line on which a read retry operation is performed and the first blank word line. The edge word line is the word line in the word lines which is the most adjacent to the first blank word line, and the remaining word lines are inner word lines. In the same group of word line, the second voltage offset value corresponding to the edge word line is greater than the second voltage offset value corresponding to the inner word line. The read retry voltage is obtained by summing the first voltage offset value, the second voltage offset value and the default read voltage corresponding to respective word line.

FIG. 12A shows an example form of the second-type read retry table. FIG. 12B shows the correspondence between the second-type read retry table and the read retry table in FIG. 8. Wherein the close blk is a closed block, and a closed block is closed for a programming operation. The open block is an open block, and the open block is activated or open for a programming operation. The open WL is the inner word line in the open block. The inner WL is the inner word line and edge WL is the edge word line. The second voltage offset values in FIGS. 12A and 12B may be applied to the overall offset of the first voltage offset values for all storage states of the memory cell.

As an example, taking the TLC memory cells with word lines 0-231 as an example, the first group includes word lines 0-56, the second group includes word lines 57-116, the third group includes word lines 117-172, and the fourth group includes word lines 173-230, the group here includes the written word line, the inner word line and the edge word line. When the number of the word lines is further increased, more groups may be added, and the number of the word lines included in each of the groups may be the same or different. As an example, when the written word lines which are word lines 0-57 fall into the second group, the word lines 0-56 also belong to the second group, and the second voltage offset value in the second-type read retry table is queried according to the mode for querying corresponding to the second group. In FIG. 12A, each of the groups of written word lines corresponds to two different second voltage offset values. The absolute value of the second voltage offset value corresponding to the edge word line is greater than the absolute value of the second voltage offset value corresponding to the inner word line. Here, the memory cells with the same storage state in storage states correspond to the same second voltage offset value, and four groups may correspond to eight second voltage offset values.

In some examples, as shown FIG. 12B, the respective part of RR-1 and RR-9 to RR-33 in setting 1 corresponds to parts in the first-type read retry table corresponding to the closed block shown in FIG. 8 and FIG. 10, which is the offset reference voltage for the second voltage offset value, with 26 RR settings. For the reference case corresponding to setting 1, the second voltage offset value relative to the first voltage offset value for the closed block is 0.

Referring to FIG. 12A, when the written word lines which are word lines 0-10 fall into the first group, wherein the inner word lines are word lines 0-9, the corresponding second voltage offset value may be −90 mv, and the edge line is word line 10, the corresponding second voltage offset value is −190 mv. The read retry operation of the inner word lines may refer to setting 2 shown in FIG. 12B. The first voltage offset values corresponding to all storage states in each of the RR settings added with the second voltage offset value of −90 mv, is to replace the RR-34 to RR-59 settings in the original read retry table in FIG. 8. Here, the edge word line is word line 10, which corresponds to the setting 5 in FIG. 12B, and the second voltage offset value is −190 mv, for all the storage states, in the basis of the first voltage offset value for the closed block, for all storage states, the voltage may be offset by the second voltage offset value.

When the written word lines which are word lines 0-57 fall into the second group, wherein the inner word lines are word lines 0-56. The operation is not performed based on the second voltage offset value for the first group, but based on the second voltage offset value of the second group of −60 mv. Corresponding to setting 3 in FIG. 12B, the first voltage offset values corresponding to the closed blocks are all offset by −60 mv. The edge word line is word line 57, and the second voltage offset value is −160 mv. Corresponding to the setting 6 in FIG. 12B, the first voltage offset values corresponding to the closed blocks are all offset by −160 mv. Similarly, for the third group of written word lines, the second voltage offset value for the inner word line is −30 mv, and the second voltage offset value for the edge word line is −120 mv. For the fourth group of written word lines, the second voltage offset value for the inner word line is 0 mv, and the second voltage offset value for the edge word line is −90 mv.

As shown in FIG. 12B, after the second read retry table is set in the example of present disclosure, the total number of RR setting items of the read retry table may include 26 items for the closed block as offset reference, 8 setting items of the second voltage offset value and 7 additional scenarios. The amount of data in the read retry table is reduced in the example of present disclosure, which facilitates faster lookup by the firmware and improves the poll rate of the read retry operation, and hence accelerate the read rate of the memory system, compared to the 189 RR setting items shown in FIG. 8.

In some examples, the shorter the distance between the inner word line and the word line 0 is, the greater the absolute value of the offset between the second voltage offset value corresponding to the inner word line which falls into the corresponding group and the first voltage offset value is. The shorter the distance between the edge word line and the word line 0 is, the greater the absolute value of the offset between the second voltage offset value in the second-type read retry table corresponding to the edge word line which falls into the corresponding group and the first voltage offset value is. When the edge word line and the inner word line fall into the same group, the absolute value of the offset between the second voltage offset value corresponding to the edge word line and the first voltage offset value is greater than the absolute value of the offset between the second voltage offset value corresponding to the inner word line and the first voltage offset value.

Referring to FIG. 12A, for the inner word lines belong to different groups, the shorter the distance between the inner word line and the word line 0 is, the smaller the number is, the earlier the position in the programming order is, and the greater the absolute value of the corresponding second voltage offset value is. For the edge word line in different groups, the shorter the distance between the edge word line and the word line 0, the smaller the number is, the earlier the position in the programming order is, and the greater the absolute value of the corresponding second voltage offset value is. In the same group, the absolute value of the second voltage offset value corresponding to the edge word line may be greater than the absolute value of the second voltage offset value corresponding to the inner word line.

In some examples, the memory cell comprises a multi-bit memory cell, the multi-bit memory cell reads multi-bit memory data through multi-stage read voltages. The second voltage offset values corresponding to read voltages for respective stages in the multi-stage read voltages are the same, or the second voltage offset values corresponding to read voltages for a portion of stages in the multi-stage read voltages are different.

Referring to FIGS. 12A and 12B, for the memory cells coupled to the same word line, the voltages are offset by a same second voltage offset value, regardless of the storage state in which the memory cell is.

In some examples, the second voltage offset values corresponding to read voltages for at least two stages in the multi-stage read voltages are different; the multi-stage read voltages are divided into a plurality of sections, each of which includes read voltages for one stage or read voltages for adjacent multiple stages. The second voltage offset values corresponding to read voltages for respective stages in one of the sections are the same, and the second voltage offset values corresponding to the multi-stage read voltages in different ones of the sections are different.

As shown in FIG. 12C, the storage states are divided into multiple sections. For the memory cells coupled to the same word line, the second voltage offset values corresponding to different storage states in which the memory cells are also different. Taking the P1 to P7 storage states in which the TLC memory cells may be as an example, only the first group of word lines and the second group of word lines are shown as an example. For example, the 7-stage read voltages of the TLC memory cell are divided into three sections, and the corresponding second voltage offset values applied to the read retry operation settings are also divided into three sections. Wherein, the first section may only include the P1 state, the second section may include the P2 to P6 states, and the third section may include the P7 state.

Take the written word lines falling into word lines 0-56 as an example, the second voltage offset value corresponding to the P1 storage state of the memory cell coupled to the inner word line is −100 mv, the second voltage offset value corresponding to P2 to P6 states is −90 mv, the second voltage offset value corresponding to P7 state is −80 mv. The second voltage offset value corresponding to the P1 storage state of the memory cell coupled to the edge word line is −200 mv, the second voltage offset value corresponding to P2 to P6 states is −190 mv, and the second voltage offset value corresponding to the P7 state is −180 mv.

In other examples, when the storage states of the memory cell are further increased, for example, for the QLC with P1 to P15 states, the first section includes P1 state, the second section includes P2 to P14 states, and the third section includes P15 state. Alternatively, the first section includes states P1 to P2 states, the second section includes states P3 to P13 states, and the third section includes states P14 to P15 states. It is also possible to be divided into more sections, each of the sections includes same or different number of storage states to increase the accuracy of the second voltage offset value and improve the pass rate of the read retry operation.

In some examples, each of the groups corresponds to a plurality of sections. For the plurality of different sections corresponding to one group, the smaller the average number of the stages for the read voltages included in the corresponding section is, the greater the absolute value of the offset between the second voltage offset value corresponding to the corresponding section and the first voltage offset value is.

As shown in FIG. 12C, for the sections divided for the storage states of the memory cells corresponding to the first group of written word lines, the average number of stages in the first section is smaller than that in the second section, and the average number of stages in the second section is smaller than that in the third section. The absolute value of the second voltage offset value corresponding to the inner word line in the first section is the greatest, and that in the second section is the second, and that in the third section is the least. The variation rule of the second voltage offset value for the edge word line is the same as that for the inner word line and will not be described repeatedly. In some examples, the variation rule of the storage state corresponding to a second voltage offset value may relate to the amount of charges stored in the memory cell. When the amount is small, a greater threshold voltage offset will be generated, and the greater voltage offset values are required to correct.

In some examples, the memory controller 106 is configured to: after performing the read retry operation, perform a hard decode operation on the data which the read retry operation has been performed on, perform a soft decode operation in response to a failure of the hard decode operation, perform a redundant array data recovery operation in response to a failure of the soft decode operation.

Referring to FIG. 6, when the memory controller 106 controls the memory device 104 to perform a read operation, a default read operation (FW default read) is firstly performed on a memory cell at a corresponding physical address, then a read retry operation is performed after a failure of the default read operation, then a soft decode operation is performed after the failure of the read retry operation, and then a redundant array data recovery (RAID) operation is performed after the failure of the soft decode operation, then the read operation is stopped after the failure of the RAID operation and the read fails, because the error may not be corrected. The memory controller 106 transmits the signal of read fail to the host 108.

Figure 13:
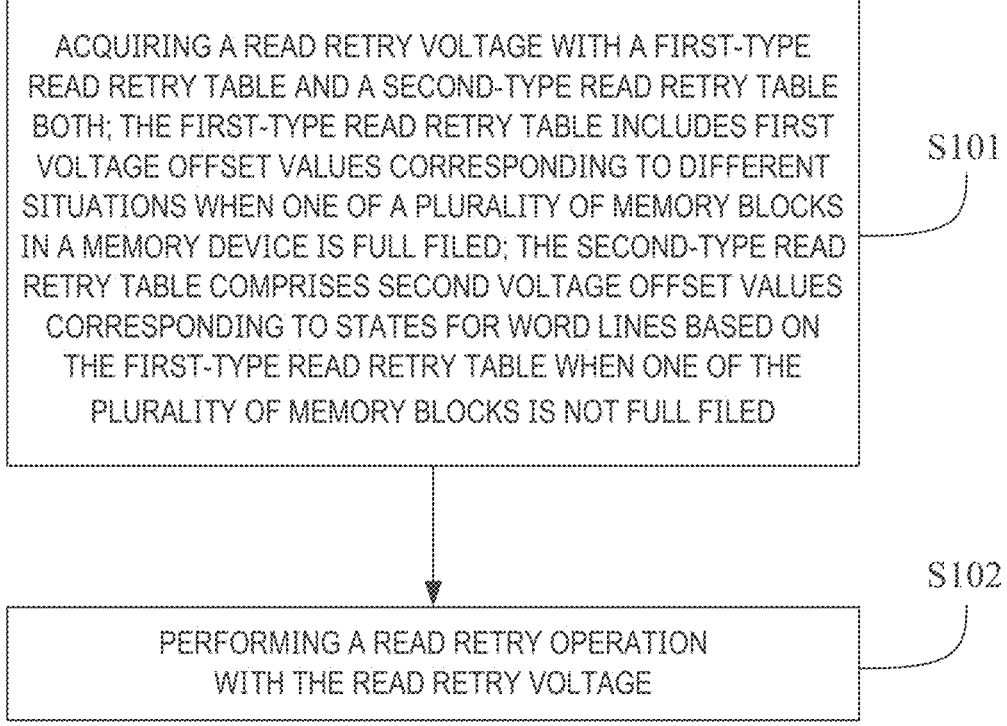
FIG. 13 is a schematic diagram of an operation flow of a memory system according to an example of the present disclosure.

According to some examples of present disclosure, a method of operating a memory system 102 is provided, as shown in FIG. 13, the method comprises: acquiring a read retry voltage with both a first-type read retry table and a second-type read retry table, the first-type read retry table includes first voltage offset values corresponding to different situations when one of a plurality of memory blocks in a memory device is closed, the second-type read retry table includes second voltage offset values corresponding to states for respective word lines when one of the plurality of memory blocks is open, based on the first-type read retry table; performing a read retry operation with the read retry voltage.

In some examples, the memory block comprises both a first memory block which is an open block, acquiring a read retry voltage with a first-type read retry table and a second-type read retry table further comprises: obtaining the first voltage offset value corresponding to the first memory block with the first-type read retry table, obtaining a corresponding second voltage offset value with the second-type read retry table and by referring to a group to which the word line coupled to a memory cell to be read in the first memory block belongs and the relationship between the word line coupled to the memory cell to be read and a first blank word line, obtaining the read retry voltage for performing a read operation on the memory cell to be read in the first memory block, according to the first voltage offset value and the second voltage offset value.

In some examples, obtaining the read retry voltage corresponding to the memory cell to be read in the first memory block according to the first voltage offset value and the second voltage offset value further comprises: obtaining a total offset voltage value by summing the first voltage offset value and the second voltage offset value, obtaining the read retry voltage by summing a default read voltage and the total offset voltage value.

In some examples, the memory block comprises word line 0 to word line N which are numbered sequentially according to physical location. The memory block is programmed in the order from the word line 0 to the word line N, wherein N is an integer greater than 2. All the word lines included in the memory block are divided into a plurality of groups, each of the groups including a plurality of adjacent word lines. All the word lines in the first memory block include: the first blank word line, the edge word line adjacent to the first blank word line, and an inner word line spaced from the first blank word line with a distance, wherein the edge word line when falling into different groups has different second voltage offset values, and the inner word line when falling into different groups has different second voltage offset values.

In some examples, the number of the word lines included in each of the groups is the same or similar.

In some examples, the edge word line and the inner word line, when falling into the same group, have different second voltage offset values.

In some examples, the shorter the distance between the inner word line and the word line 0 is, the greater the absolute value of the offset between the second voltage offset value corresponding to the inner word line which falls into the corresponding group and the first voltage offset value is. The shorter the distance between the edge word line and the word line 0 is, the greater the absolute value of the offset between the second voltage offset value in the second-type read retry table corresponding to the edge word line which falls into the corresponding group and the first voltage offset value is. When the edge word line and the inner word line fall into the same group, the absolute value of the offset between the second voltage offset value corresponding to the edge word line and the first voltage offset value is greater than the absolute value of the offset between the second voltage offset value corresponding to the inner word line and the first voltage offset value.

In some examples, the memory cell comprises a multi-bit memory cell, the multi-bit memory cell reads multi-bit memory data through multi-stage read voltages. The second voltage offset values corresponding to read voltages for respective stages in the multi-stage read voltages are the same, or the second voltage offset values corresponding to read voltages for a portion of stages in the multi-stage read voltages are different.

In some examples, the second voltage offset values corresponding to read voltages for at least two stages in the multi-stage read voltages are different; the multi-stage read voltages are divided into a plurality of sections, each of which includes read voltages for one stage or read voltages for adjacent multiple stages. The second voltage offset values corresponding to read voltages for respective stages in one of the sections are the same, and the second voltage offset values corresponding to the multi-stage read voltages in different ones of the sections are different.

In some examples, each of the groups corresponds to the plurality of sections. For the plurality of different sections corresponding to one group, the smaller the average number of the stages for the read voltages included in a corresponding section is, the greater the absolute value of the offset between the second voltage offset value corresponding to the corresponding section and the first voltage offset value is.

In some examples, the memory device 104 comprises multiple types of memory pages; the different situations include at least one of the following: different number of storage bits included in the memory cell, different types of the memory pages, or different usage scenarios of the memory device.

In some examples, the method further comprises: after performing the read retry operation, performing a hard decode operation on the data which the read retry operation has been performed on, performing a soft decode operation in response to a failure of the hard decode operation, performing a redundant array data recovery operation in response to a failure of the soft decode operation.

According to some aspects of the examples of present disclosure, a readable storage medium is provided, on which a computer program is stored, when executed, the computer program performs the method of above examples. The readable storage medium may include a NAND memory. The memory cells of the NAND memory may include a floating gate type memory cell including a floating gate transistor or a charge trapping type memory cell including a charge trapping transistor.

The foregoing are only examples of the present disclosure, but the scope of protection of the present disclosure is not limited thereto. Any variation or permutation readily contemplated by those skilled in the art within the scope of the present disclosure should be covered within the scope of protection of the present disclosure. Therefore, the scope of protection of this disclosure shall be subject to the scope of protection of the claims.

What is claimed is:

1. A memory system, comprising:
a memory device, comprising:
a plurality of memory blocks, each of which comprises:
a plurality of word lines; and
a plurality of memory cells coupled to the plurality of word lines; and
a memory controller, which is coupled to the memory device and configured to:
acquire a read retry voltage with both a first-type read retry table and a second-type read retry table, wherein:
the first-type read retry table includes first voltage offset values corresponding to different situations when one of the plurality of memory blocks is closed; and
the second-type read retry table includes second voltage offset values corresponding to states for the respective word lines when one of the plurality of memory blocks is open, based on the first-type read retry table; and
control the memory device to perform a read retry operation with the read retry voltage.

2. The memory system of claim 1, wherein the memory block comprises a first memory block which is an open block, and the memory controller is configured to:
obtain the first voltage offset value corresponding to the first memory block with the first-type read retry table;
obtain a corresponding second voltage offset value with the second-type read retry table and by referring to a group to which the word line coupled to the memory cell to be read in the first memory block belongs and relationship between the word line coupled to the memory cell to be read and a first blank word line; and
obtain the read retry voltage for performing a read operation on the memory cell to be read in the first memory block according to the first voltage offset value and the second voltage offset value.

3. The memory system of claim 2, wherein the memory controller is configured to:
obtain a total offset voltage value by summing the first voltage offset value and the second voltage offset value; and
obtain the read retry voltage by summing a default read voltage and the total offset voltage value.

4. The memory system of claim 2, wherein:
the memory block comprises word line 0 to word line N which are numbered sequentially according to physical location; the memory block is programmed in order from the word line 0 to the word line N, wherein N is an integer greater than 2;
all the word lines of the memory block are divided into a plurality of groups, each of the groups includes a plurality of adjacent word lines; and
all the word lines in the first memory block include: the first blank word line, an edge word line adjacent to the first blank word line, and an inner word line spaced from the first blank word line with a distance, wherein:
the edge word line when falling into different groups has different second voltage offset values, and the inner word line when falling into different groups has different second voltage offset values.

5. The memory system of claim 4, wherein the edge word line and the inner word line, when falling into the same group, have different second voltage offset values.

6. The memory system of claim 4, wherein the number of the word lines included in each of the groups is the same.

7. The memory system of claim 4, wherein
the shorter the distance between the inner word line and the word line 0 is, the greater the absolute value of an offset between the second voltage offset value corresponding to the inner word lines which fall into a corresponding group and the first voltage offset value is;
the shorter the distance between the edge word line and the word line 0 is, the greater the absolute value of the offset between the second voltage offset value in the second-type read retry table corresponding to the edge word line which falls into a corresponding group and the first voltage offset value is; and
when the edge word line and the inner word line fall into the same group, the absolute value of the offset between the second voltage offset value corresponding to the edge word line and the first voltage offset value is greater than the absolute value of the offset between the second voltage offset value corresponding to the inner word line and the first voltage offset value.

8. The memory system of claim 4, wherein, the memory cell comprises a multi-bit memory cell which reads multi-bit memory data through multi-stage read voltages, wherein:
the second voltage offset values corresponding to read voltages for respective stages in the multi-stage read voltages are the same; or
the second voltage offset values corresponding to read voltages for a portion of stages in the multi-stage read voltages are different.

9. The memory system of claim 8, wherein:
the second voltage offset values corresponding to read voltages for at least two stages in the multi-stage read voltages are different;
the multi-stage read voltages are divided into a plurality of sections, each of which includes read voltages for one stage or read voltages for adjacent multiple stages; and
the second voltage offset values corresponding to read voltages for respective stages in one of the sections are the same, and the second voltage offset values corresponding to the multi-stage read voltages in different ones of the sections are different.

10. The memory system of claim 9, wherein:
each of the groups corresponds to a plurality of sections; and
for the plurality of sections corresponding to one group, the smaller an average number of the stages for the read voltages included in a corresponding section is, the greater the absolute value of the offset between the second voltage offset value corresponding to the corresponding section and the first voltage offset value is.

11. The memory system of claim 1, wherein:
the memory device comprises multiple types of memory pages; and
the different situations include at least one of the following:
different number of storage bits included in the memory cell;
different types of the memory pages; or
different usage scenarios of the memory device.

12. The memory system of claim 1, wherein the memory controller is configured to:
after performing the read retry operation, perform a hard decode operation on data which the read retry operation has been performed on;
perform a soft decode operation in response to a failure of the hard decode operation; and
perform a redundant array data recovery operation in response to a failure of the soft decode operation.

13. A method of operating a memory system, comprising:
acquiring a read retry voltage with both a first-type read retry table and a second-type read retry table, wherein:
the first-type read retry table includes first voltage offset values corresponding to different situations when one of a plurality of memory blocks of a memory device is closed; and
the second-type read retry table includes second voltage offset values corresponding to states for respective word lines when one of the plurality of memory blocks is open, based on the first-type read retry table; and
performing a read retry operation with the read retry voltage.

14. The method of claim 13, wherein, the memory block comprises a first memory block which is an open block, and acquiring a read retry voltage with both a first-type read retry table and a second-type read retry table further comprises:
obtaining the first voltage offset value corresponding to the first memory block with the first-type read retry table;
obtaining the corresponding second voltage offset value with the second-type read retry table and by referring to a group to which the word line coupled to a memory cell to be read in the first memory block belongs and relationship between the word line coupled to the memory cell to be read and a first blank word line; and
obtaining the read retry voltage for performing a read operation on the memory cell to be read in the first memory block according to the first voltage offset value and the second voltage offset value.

15. The method of claim 14, wherein obtaining the read retry voltage corresponding to the memory cell to be read in the first memory block according to the first voltage offset value and the second voltage offset value further comprises:
obtaining a total offset voltage value by summing the first voltage offset value and the second voltage offset value; and
obtaining the read retry voltage by summing a default read voltage and the total offset voltage value.

16. The method of claim 14, wherein:
the memory block comprises word line 0 to word line N which are numbered sequentially according to physical location; the memory block is programmed in order from the word line 0 to the word line N, wherein N is an integer greater than 2;
all the word lines included in the memory block are divided into a plurality of groups, each of the groups includes a plurality of adjacent word lines; and
all the word lines in the first memory block include: the first blank word line, an edge word line adjacent to the first blank word line, and an inner word line spaced from the first blank word line with a distance, wherein:
the edge word line when falling into different groups has different second voltage offset values, and the inner word line when falling into different groups has different second voltage offset values.

17. The method of claim 16, wherein:
the shorter the distance between the inner word line and the word line 0 is, the greater the absolute value of an offset between the second voltage offset value corresponding to the inner word line which falls into a corresponding group and the first voltage offset value is;
the shorter the distance between the edge word line and the word line 0 is, the greater the absolute value of the offset between the second voltage offset value in the second-type read retry table corresponding to the edge word line which falls into a corresponding group and the first voltage offset value is; and
when the edge word line and the inner word line fall into the same group, the absolute value of the offset between the second voltage offset value corresponding to the edge word line and the first voltage offset value is greater than the absolute value of the offset between the second voltage offset value corresponding to the inner word line and the first voltage offset value.

18. The method of claim 16, wherein:
the memory cell comprises a multi-bit memory cell which reads multi-bit memory data through multi-stage read voltages, wherein:

the second voltage offset values corresponding to read voltages for respective stages in the multi-stage read voltages are the same; or the second voltage offset values corresponding to read voltages for a portion of stages in the multi-stage read voltages are different.

19. The method of claim 18, wherein:

the second voltage offset values corresponding to read voltages for at least two stages in the multi-stage read voltages are different;

the multi-stage read voltages are divided into a plurality of sections, each of which includes read voltages for one stage or read voltages for adjacent multiple stages; and the second voltage offset values corresponding to read voltages for respective stages in one of the sections are the same, and the second voltage offset values corresponding to the multi-stage read voltages in different ones of the sections are different.

20. A readable storage medium having a computer program stored thereon, which, when executed, performs operations comprising:

acquiring a read retry voltage with both a first-type read retry table and a second-type read retry table, wherein:

the first-type read retry table includes first voltage offset values corresponding to different situations when one of a plurality of memory blocks of a memory device is closed; and the second-type read retry table includes second voltage offset values corresponding to states for respective word lines when one of the plurality of memory blocks is open, based on the first-type read retry table; and performing a read retry operation with the read retry voltage.

* * * * *